(12) United States Patent
Kerger et al.

(10) Patent No.: US 9,179,277 B2
(45) Date of Patent: *Nov. 3, 2015

(54) OUTPUT MANAGEMENT FOR ELECTRONIC COMMUNICATIONS

(71) Applicant: QUALCOMM Incorporated, San Diego, CA (US)

(72) Inventors: Kameron Noell Kerger, San Diego, CA (US); Mark Aaron Lindner, Verona, WI (US); Anne Katrin Konertz, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/595,490

(22) Filed: Jan. 13, 2015

(65) Prior Publication Data

US 2015/0126169 A1 May 7, 2015

Related U.S. Application Data

(63) Continuation of application No. 13/796,561, filed on Mar. 12, 2013, now Pat. No. 8,970,662.

(51) Int. Cl.
*H04N 7/14* (2006.01)
*H04W 76/00* (2009.01)
(Continued)

(52) U.S. Cl.
CPC ............... *H04W 4/16* (2013.01); *G06F 1/1694* (2013.01); *G06F 3/017* (2013.01); *G06F 3/04883* (2013.01); *H04L 65/1083* (2013.01); *H04L 65/4061* (2013.01); *H04L 65/601* (2013.01); *H04M 1/7255* (2013.01); *H04N 7/147* (2013.01); *H04W 4/10* (2013.01); *H04W 4/12* (2013.01); *H04W 4/206* (2013.01); *H04W 76/005* (2013.01); *G06F 2200/1637* (2013.01); *H04W 4/08* (2013.01)

(58) Field of Classification Search
CPC ....... H04L 65/60; H04L 65/605; H04L 65/80; A63H 2200/00; H04N 19/0003
USPC ........... 348/14.02, 14.05, 14.07, 14.08, 14.12
See application file for complete search history.

(56) References Cited

U.S. PATENT DOCUMENTS 5,790,671 A 8/1998 Cooper
6,353,635 B1 3/2002 Montague et al.
(Continued)

OTHER PUBLICATIONS

International Search Report and Written Opinion—PCT/US2014/023165—ISA/EPO—Jul. 23, 2014.

*Primary Examiner* — Binh Tieu
(74) *Attorney, Agent, or Firm* — The Marbury Law Group, PLLC

(57) ABSTRACT

Methods, systems and devices are provided for managing electronic communications on a communication device including receiving an incoming call indication from an originating device. The methods, system and devices may include transmitting a delay indication in response to determining the delayed call acceptance is warranted and receiving a first message segment and subsequently a second message segment from the originating device. Additionally, they may include outputting at least one of the first message segment and the second message segment in response to determining whether to output at least one of the first message segment and the second message segment. Further, they may include transmitting a playback status including a series of status indications reflecting an updated output progress of the first message segment at a recipient device in response to determining the first message segment should be output.

20 Claims, 25 Drawing Sheets

(51) Int. Cl.
*H04L 29/06* (2006.01)
*H04W 4/10* (2009.01)
*H04W 4/16* (2009.01)
*G06F 3/01* (2006.01)
*H04W 4/20* (2009.01)
*G06F 1/16* (2006.01)
*G06F 3/0488* (2013.01)
*H04M 1/725* (2006.01)
*H04W 4/12* (2009.01)
*H04W 4/08* (2009.01)

(56) References Cited

U.S. PATENT DOCUMENTS

| | | | |
|---|---|---|---|
| 7,809,388 B1 | 10/2010 | Othmer | |
| 8,175,167 B2 | 5/2012 | Bouton et al. | |
| 8,204,742 B2 | 6/2012 | Yang et al. | |
| 2003/0013495 A1 | 1/2003 | Oleksy | |
| 2003/0017836 A1 | 1/2003 | Vishwanathan et al. | |
| 2006/0171351 A1 | 8/2006 | Wild et al. | |
| 2008/0132290 A1 | 6/2008 | Sharabi et al. | |
| 2009/0103739 A1 | 4/2009 | Strait et al. | |
| 2010/0105446 A1* | 4/2010 | Charlier et al. | 455/569.1 |
| 2010/0323669 A1 | 12/2010 | Maggenti et al. | |
| 2012/0289277 A1 | 11/2012 | Ahmed et al. | |
| 2013/0024550 A1* | 1/2013 | Chapweske et al. | 709/219 |
| 2013/0132525 A1* | 5/2013 | Tippin | 709/219 |
| 2014/0082146 A1 | 3/2014 | Bao et al. | |
| 2014/0143806 A1* | 5/2014 | Steinberg et al. | 725/34 |
| 2014/0267543 A1 | 9/2014 | Kerger et al. | |
| 2014/0274187 A1 | 9/2014 | Kerger et al. | |

* cited by examiner

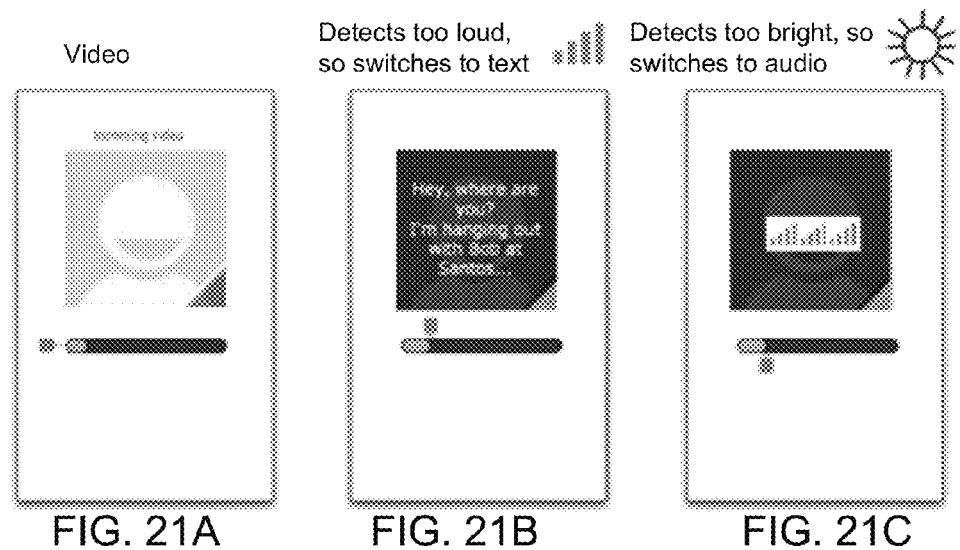
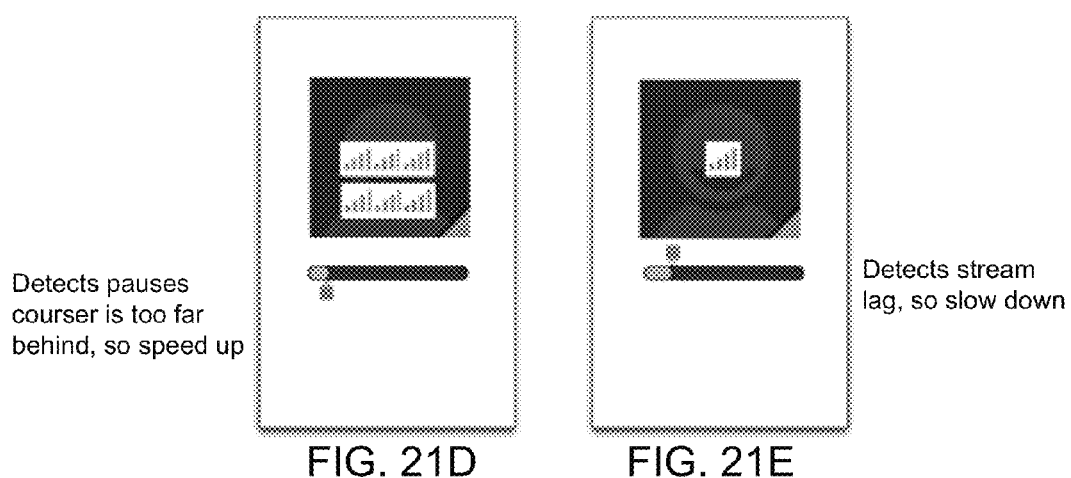

though they have faster call setup times, e.g., setup
OUTPUT MANAGEMENT FOR ELECTRONIC COMMUNICATIONS This application is a continuation application of and claims the benefit of priority to U.S. Non-provisional patent application No. 13/796,561 entitled "Output Management for Electronic Communications" filed Mar. 12, 2013, assigned to the assignee hereof, the entire contents of which is hereby incorporated by reference for all purposes.

BACKGROUND

Various wired and wireless networks have evolved to handle Push-To-Talk (PTT) communication sessions, including PTT over cellular that makes two-way radio service available to mobile communication devices over traditional cellular networks. PTT provides a quick one-to-one or one-to-many communication technique that is particularly useful for many applications. A PTT communication connection is typically initiated by pressing a button, activating an icon or some other means of activation on an originating wireless communication device that opens communications between the originator and each member device of the group. Existing PTT systems have advantages over traditional cellular systems because they have faster call setup times, e.g., setup times ideally in the range of 1 second, compared to cellular voice channels that can take more than 5 seconds to establish a connection.

In some arrangements, one PTT speaker at a time is given permission to speak. Such a permission is typically referred to as a "floor grant," where no other group member of the PTT session can speak until the mobile device with the floor grant releases the floor. Various forms of electronic communications have been developed for people to exchange information even when physically distant from one another. Through the use of electronic communication devices and telecommunication networks, two or more people may communicate over virtually any distance. Historically, such telecommunications were associated with just telephones, but today computers and mobile electronic devices may also be used to communicate for exchanging not just audio (i.e., voice), but also text, video, data or any combination thereof.

While modern electronic communication devices are very useful, at times the intended recipient of a live communication transmission, such as a telephone or video conference call, is not prepared or not in appropriate surroundings to receive the transmission. For example, the recipient may be in a very quiet environment, like a library, or a very loud environment, like a construction site, making the audio output from the recipient communication device either unwelcome or inaudible. Also, some virtually instant communication methods, such as push-to-talk, do not provide the recipient device a way of delaying or managing the incoming communications. Similarly, in a very bright environment, like outside on a sunny day, or in a very dark environment, like at a movie theatre, a video output may not be clearly visible or may be inappropriate or undesirable. Also, regardless of the environment surrounding the recipient device, sometimes the recipient themselves may be busy or need a brief delay before getting involved in a call. In this way, electronic communications often suffer user experience issues since users are unable to or limited in how they may manage the output of electronic communications.

SUMMARY

The various embodiments include methods, system and devices for managing electronic communications on a communication device including receiving an incoming call indication from an originating device. The methods, system and devices may include transmitting a delay indication in response to determining the delayed call acceptance is warranted and receiving a first message segment and subsequently a second message segment from the originating device. Additionally, they may include outputting at least one of the first message segment and the second message segment in response to determining whether to output at least one of the first message segment and the second message segment. Further, they may include transmitting a playback status including a series of status indications reflecting an updated output progress of the first message segment at a recipient device in response to determining the first message segment should be output.

Further embodiments may include a computing device having a processor configured with processor-executable instructions to perform various operations corresponding to the methods discussed above.

Further embodiments may include a computing device having various means for performing functions corresponding to the method operations discussed above.

Further embodiments may include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIGS. 21A-21E illustrate auto detect mode switching during PTX communications in accordance with an embodiment.

DETAILED DESCRIPTION

Figure 1A:
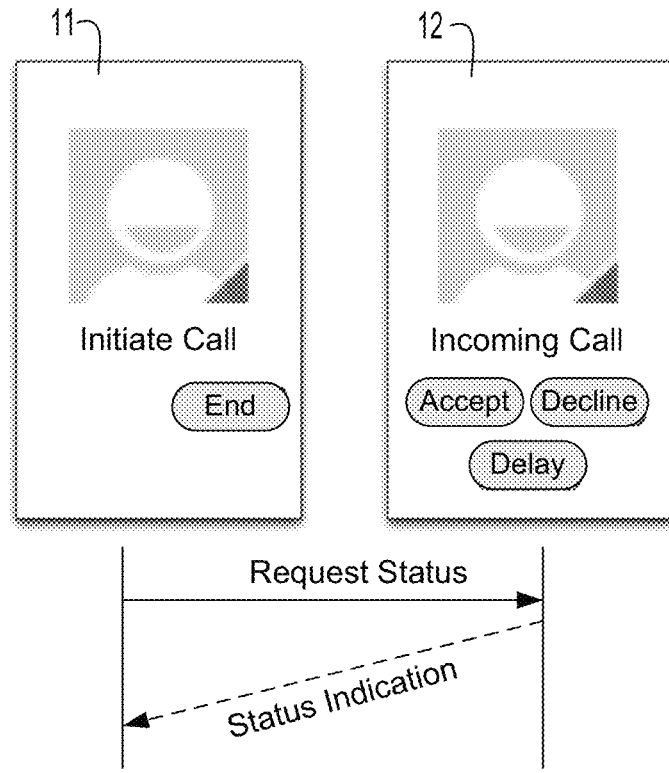
FIG. 1A illustrates a call flow diagram in accordance with an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "Press-to-Transmit," "PTX," "Push-To-Talk" or "PTT" are used herein interchangeably to refer to communication services that provides an always-on connection or at least virtually always-on, like a "walkie-talkie." Traditional Push-to-talk (PTT) may use half-duplex, meaning communication may only travel in one direction at any given moment; only one user may be heard at a time. A form of PTT messaging may also include the exchange of video. As such messaging is not limited to "talk" it is referred to as "Press-to-Transmit" or "PTX." PTX may allow one communication group member to make video images available to the entire group. Also, the expression "press-to-transmit" takes into account the fact that modern mobile communication devices often have touch-screen interfaces that only require a "press" of a finger, rather than a push. The video images may be stills or motion video and are similarly considered message segments. PTX communications may include audio or may be silent. Thus, PTX may be considered a more generic term for communications of this type that exchange at least one of audio, video and data messaging. Also, PTX as used herein may use full-duplex with controls over which communication group member(s) may have priority over a channel of communication. A PTX message segment refers to a communication segment that includes an audio and/or video transmission generating by a user. The PTX message segment includes more than just signaling data and thus includes the substantive part of the message transmitted from that user to other members of the PTX group. The message transmitted may include an audio transmission, such as a "talk spurt," a video transmission or a combination of these. In the descriptions of the various embodiments, while the messages may be referred to in terms of one or more audio segments, it should be understood that such messages may include or exclusively consist of video messages or other media streaming content intended for continuous live broadcast.

The term "outputting" as used herein refers to the action or process of producing, delivering or supplying to and/or from a device, such as a communication device like a PTX device. Outputting may include generating an audio sound, a video image, series of images or other display. Also, user interface (UI) components, such as a display, one or more speakers, printing or other means may be used for outputting. Thus, a communication device, like a PTX device, may be said to output audio, video, images, text and other information.

The terms "mobile device," "PTX device," "wireless communication device" and "communication device" are used interchangeably herein to refer to any one or all of cellular telephones, smartphones, personal or mobile multi-media players, personal data assistants (PDA's), laptop computers, tablet computers, smartbooks, palm-top computers, wireless electronic mail receivers, multimedia Internet enabled cellular telephones, wireless gaming controllers, and similar personal electronic devices which include a programmable processor and memory and may include software and/or hardware to enable group communication, particularly push-to-talk functionality.

In an embodiment, contemporary electronic communications may be enhanced by allowing a call originator to request a status indication from an intended recipient communication device. This may be done during or after a call is initiated by the call originator, for example by sending a call initiation signal. The status indication may reflect the recipient device is ready to receive communications or it may reflect the recipient device has requested a delay. The status indication may be automatically generated by the recipient communication device or provided in response to user input from the recipient communication device. Alternatively, the recipient communication device, using its microphone, may automatically detect loud conditions or a muffled condition. The user input may include the user pressing a button designated to indicate the recipient is requesting a delay. The call originator may be allowed start the call in spite of the fact that the recipient device has requested a delay. In this way, the call originator's message may be saved in a memory buffer for delayed playback. Subsequently, the recipient may elect to either playback the buffered message segment and start listening to live transmissions from the call originator. Also, if the recipient elects to playback the buffered message segment, a playback status may be provided to the call originator. In this way the call originator is kept apprised as to how much of the buffered message has been output from the recipient device. Additionally, the call originator may be able to transmit a further signal either cutting off the delayed message playback or interrupting the playback with a further message.

In another embodiment, various wired and wireless networks have evolved to handle PTX communication sessions, including push-to-talk over cellular that makes two-way radio service available to mobile communication devices over traditional cellular networks. Traditional telephones, including mobile phone networks and devices, utilize full-duplex communications, allowing customers to call other persons on a mobile or land-line network and be able to simultaneously talk and hear the other party. Such communications require a connection to be started by dialing a phone number and the other party answering the call, and the connection remains active until either party ends the call or the connection is dropped due to signal loss or a network outage. Traditional telephone communication protocols require a lengthy process of dialing, network switching and routing, call setup, and waiting for the other party to answer. In contrast, PTX has a much quicker protocol and provides virtually immediate communications. Existing PTX systems have setup times ideally in the range of 1 second, compared to traditional cellular voice channels that can take more than 5 seconds to establish a connection. Also, PTX provides the added advantage of allowing an initiating caller to establish that immediate connection with not just a single recipient device, but rather a group of recipients.

In some arrangements, one PTX speaker at a time is given permission to speak or send video images. Such a permission is typically referred to as a "floor grant," where no other group member of the PTX session can speak or send video until the mobile device with the floor grant releases the floor. Once given a floor grant, the speaker's input is immediately routed to and output from the mobile devices of all other members of the group. So when communications start-up in a PTX group, rather than having to answer a call as with traditional telephone service, the recipients immediately hear and/or see the participant (or an image transmitted by the participant) who was granted the floor. Traditionally, to release the floor the participant physically releases or reengages a PTX button, after which any other individual member of the group may press his or her PTX button in order to request a floor grant (i.e., make a "floor request").

The various embodiments provide enhanced PTX communication functionality and methods of managing those communications. In particular, the various embodiments allow individual PTX devices that are members of a PTX group to request the otherwise live PTX message segments (i.e., talk or video spurts) be diverted into a buffer for delayed playback by the requesting member(s), which may be referred to as a buffer request. In alternative embodiments, PTX message segments may be buffered in the individual receiving PTX device, in a server or connected memory in the communication system, or in the sending PTX device. Further, the PTX device may determine the need for buffering automatically based on ambient noise and/or local conditions (also referred to as the "ambient environment"). Meanwhile, other members of that same PTX group not requesting buffering may still hear those PTX message segments without delay (i.e., "live"), as in traditional PTX. Additionally, an originator of the message segments may be notified that one or more PTX group members have requested buffering or that buffering is taking place (i.e., a buffer indication), which implies those PTX group member PTX devices are not currently prepared to output messages or parts thereof. Further, the originator may either deny the buffer request or be allowed to delete and/or edit the buffered message segments before they are output from any device that did not hear them live. Knowing the buffered message segments will not be heard live, the originator may decide he/she does not need to be heard or the message should be rephrased. Eventually, the buffered message segments may be output from those PTX group member devices that requested the buffering. Also, those PTX group member devices from which a buffer request was received may eventually catch-up so that subsequent non-buffered message segments may be output from those devices.

The various embodiments may also include further enhancements related to message buffering during PTX communication sessions. For example, a playback status of the buffered message segments may be provided to the originating PTX device. The playback status may indicate whether a particular message segment has been played back and/or how much of it has been played back. Additionally, the playback status may include a speech-to-text translation of the PTX message segment or at least portions thereof. Further, the playback status may indicate the portion of that speech-to-text translation that has been output at a particular recipient PTX device.

As mentioned above, the buffering may take place at the recipient PTX device requesting the buffer, at the originating PTX device or some other memory storage resource available to the PTX network. Also, a PTX network server may manage the buffered message segments, so that once a ready signal is received indicating the buffer requesting recipient PTX device is ready to output message segments, those segments may be output or the rest of the PTX group may be notified. Thus, depending on whether the originating PTX device indicated a particular segment should be deleted, it may be either allowed to output or prevented from outputting that segment when the ready signal is received.

In an embodiment a method, system or device is disclosed for managing PTX communications on a PTX device. A recipient PTX device may receive a first indication that a floor grant has been granted to an originating PTX device. Also, a determination may be made as to whether a PTX message segment from the originating PTX device should be buffered for delayed playback by the recipient PTX device. A buffer signal may be transmitted based on determining the PTX message segment should buffered. The buffer signal may indicate one of a request to buffer the PTX message segment and a recipient storage indication signifying the PTX message segment will be stored in a memory of the first recipient PTX device. Further, a ready signal may be transmitted indicating the recipient PTX device is ready to output PTX message segments.

In the various embodiments, the PTX message segment may be received at the recipient PTX device. Also, the PTX message segment may be stored in the memory at the recipient PTX device in response to determining the PTX message segment should buffered, the buffer signal including the recipient storage indication. Further, a delete signal may be received associated with the PTX message segment, which may include deleting the PTX message segment from the memory of the recipient PTX device. A floor taken signal may be received as the first indication that the originating PTX device has been granted the floor grant. The floor taken signal may be transmitted separately from the PTX message segment. Additionally, a playback status may be transmitted indicating a portion of the PTX message segment that has been output from the recipient PTX device. Further, an ambient noise level around the recipient PTX device may be measured. In this way, determining whether the PTX message segment from the originating PTX device should be buffered may be based on the ambient noise level measurement. Further still, input from a user interface of the recipient PTX device may be received. Thus, determining whether the PTX message segment from the originating PTX device should be buffered may be based on the input from the user interface.

In another embodiment, a method, system and device for managing PTX communications between PTX devices is disclosed. In particular at least one of a buffer request and a buffer status may be received from a recipient PTX device. The buffer request and the buffer status may be associated with a PTX message segment from an originating PTX device being stored for delayed playback. Also, a buffer indication may be transmitted to the originating PTX device reflecting at least one of the buffer request and the buffer status have been received from the recipient PTX device.

In the various embodiments, the PTX message segment may be stored in a memory of the server. Also, a ready signal may be received indicating the recipient PTX device is ready to output PTX message segments. The PTX message segment may then be transmitted to the recipient PTX device in response to receiving the ready signal. Further, the PTX message segment may be stored in a memory of the server and a delete signal may be received from the originating PTX device. In this way, the PTX message segment may be deleted from the memory to prevent outputting the PTX message segment from the recipient PTX device. Alternatively, a first delete signal may be received from the originating PTX device for preventing the PTX message segment from being output from the recipient PTX device. Also, a second delete signal may be transmitted to the recipient PTX device for the recipient PTX device to delete the PTX message segment. Further, a playback status may be received at the server indicating how much of the PTX message segment has been output from the recipient PTX device. Additionally, that playback status may be transmitted to the originating PTX device. Further still, a speech-to-text translation of at least a portion of the PTX message segment may be received from the recipient PTX device. A playback status may thus be transmitted to the originating PTX device indicating the portion of the speech-to-text translation that has been output by the recipient PTX device. The speech-to-text translation of at least a portion of the PTX message segment may be generated by the server or a related resource. In this way, a playback status may be transmitted to the originating PTX device indicating the portion of the speech-to-text translation that has been output by the recipient PTX device.

In a further embodiment a method, system and device is disclosed for managing PTX communications on a PTX device. For example, an originating PTX device with an active floor grant may receive at least one of a buffer request and a buffer status. The buffer request and the buffer status may be associated with a PTX message segment from the originating PTX device being stored for delayed playback at a recipient PTX device. Also, the originating PTX device may output an indication of the at least one of a buffer request and the buffer status. A ready signal may be received indicating the recipient PTX device is ready to output PTX message segments.

In the various embodiments the PTX message segment may be stored in a memory at the originating PTX device. Also, the PTX message segment may be transmitted in response to receiving the ready signal. The PTX message segment may be stored in a memory so a determination may be made as to whether the PTX message segment should be deleted. The PTX message segment may then be deleted from the memory in response to determining the PTX message segment should be deleted to prevent the recipient PTX device from outputting at least a portion of the PTX message segment. It may be determined whether at least one portion of the PTX message segment should be output from the recipient PTX device. Further, a delete signal may be transmitted in response to determining the at least one portion of the PTX message segment should not be output from the recipient PTX device. A playback status may be received at the originating PTX device indicating how much of the PTX message segment has been output from the recipient PTX device. Additionally, the playback status may be output at the originating PTX device. Alternatively, a playback status may be received indicating how much of the PTX message segment has been output from the recipient PTX device. That playback status may include a speech-to-text translation of at least a portion of the PTX message segment. Also, that playback status may be displayed on the originating PTX device display. Further still, playback status may be received indicating how much of the PTX message segment has been output from the recipient PTX device and a speech-to-text translation of at least one portion of the PTX message segment is generated. The originating PTX device may display the playback status including the at least one portion of the speech-to-text translation.

In yet a further embodiment, enhancements may be provided for video transmission to be included or sent instead of audio transmissions for PTX communications. For example, the surroundings in the area of an originating device may be useful for transmission, such as at a construction site or when the user of the originating device wants recipients see something other than him/herself. Additionally, the user of the originating device may transfer it to live image of him/herself, which can in turn enable further enhancements. For example, image recognition and facial expression recognition may be used to transmit and translate facial expressions to text or emoticons. Also, image recognition may be used to convert a message from sign language into a text message or an audio message.

Another embodiments allows an originating device to request information about the state of a recipient device, such as the need for buffering. The information about the state of the recipient device may be displayed on the originating device's user interface (UI), such as a display. The recipient device may elect to play back the transmitted communications when ready, may have the audio message converted to a text message or may fast-forward through the audio/video message to get caught up with the live broadcast from the originating device. Additionally, the user of the originating device may designate key frames from a video transmission, which the recipient user may elect to view rather than a full video.

Additional embodiments enable users of PTX devices to control the output mode of the device. Such controls may be manual (i.e. initiated by user input) or automatically by the PTX device. In this way the user of a recipient device may be able to switch to an audio only mode by making a selection on a UI. Also, the user might elect to speed up or slow down the audio or video transmission by making another selection on the UI. These inputs may be done either by direct contact with the PTX device by the user or with gesture recognition. Gesture recognition may be performed by a PTX device provided with a camera and software capable of detecting and analyzing physical movements of the user or the orientation of the device. For example, a vertical hand swipe by the user may represent one action and a horizontal hand swipe represents another. Alternatively, an orientation of a PTX device may be employed, such as facing the device right-side down or right-side up. As a further alternative the recipient device may use sensors to determine the user's condition and selects an appropriate mode. Also, that mode may be switched as the users environment changes such as when a bright sun goes behind the clouds in an outdoor environment or if the ambient noise levels around the recipient device changes.

Further embodiments include recipient devices capable of receiving several audio and/or video streams simultaneously. Rather than hearing and seeing all the video and audio segments simultaneously, a user of a recipient device may elect to watch only select ones of the available videos or only listen to select ones of available audio. In this way the recipient device may display a video stream from one originating device that includes an audio output and display only the video stream from another originating device without the audio output there from. A device may also be provided with features to convert audio to text in order to minimize or eliminate some of the sound emitted from the recipient device. Also, an audio to text conversion may provide subtitles to a video display. A further enhancement to this feature may even include language conversions of the subtitle text or video dubbing in the form of a audio output translated to a desired language. Further still, action to text conversion features may be provided such that physical movements of a originating user are translated to text or an audio output. For example, if the originating user is waving her hand as part of a message segment, the recipient device may output as text "[WAVING HAND]" or provide an audio equivalent output thereof.

FIG. 1A illustrates a call flow diagram between a call originator 11 and an intended recipient 12. Both the call originator 11 and intended recipient 12 are represented by simply a user interface (UI). The call originator 11 transmits a request for a status indication from the intended recipient 12. The status indication may reflect the recipient device is ready to receive communications or it may reflect the recipient device has requested a delay. The status indication may be automatically generated by the intended recipient 12 communication device or provided in response to user input from the intended recipient 12. An automatic response may include situations where the user of the intended recipient device has preset a longer response time, such as additional call rings, is required. In this way, when a call comes in more than the traditional two or three rings are allowed before the call is routed to voicemail. Alternatively, the recipient communication device, using its microphone (not shown), may automatically detect loud conditions, like in a noisy crowd surrounding the device, or a muffled condition such as in a pocket or purse. The user input may include the user pressing a button designated to indicate the recipient is requesting a delay (i.e., the "Delay" button indicated on the UI). Alternatively, the intended recipient 12 may simply accept a call (i.e., by pressing the "Accept" button), which is more like the conventional telephone call answer or simply decline the call entirely (i.e., by pressing the "Decline" button).

Figure 1B:
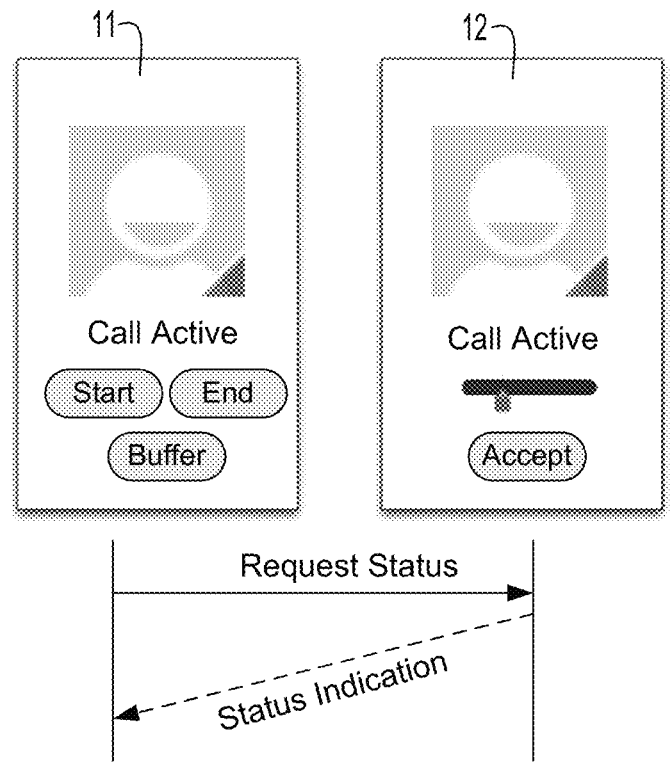
FIG. 1B illustrates another call flow diagram in accordance with an embodiment.

FIG. 1B illustrates a further call flow diagram that may follow after the call from FIG. 1A is initiated and the call is now active. The call originator 11 may be allowed start the call in spite of the fact that the intended recipient 12 has requested a delay. In this way, the call originator's message may be saved in a memory buffer for delayed playback. Subsequently, the recipient may elect to either playback the buffered message segment or skip the buffered message and just start listening to live transmissions from the call originator. As illustrated on FIG. 1B, the intended recipient 12 is in delay mode and there is a call actively being saved in a buffer. A status indication may be provided to the call originator 11, so she knows the intended recipient 12 has not yet "accepted" the call and started listening to the buffered message. In this way the call originator is kept apprised as to whether the buffered message is being output from the recipient device. Additionally, the call originator may be able to pause the buffering by pressing the "Buffer" button, and thereafter resume transmitting further message segments by hitting the "Start" button. Also, the call originator may simply end the call by pressing the "End" button.

Figure 2:
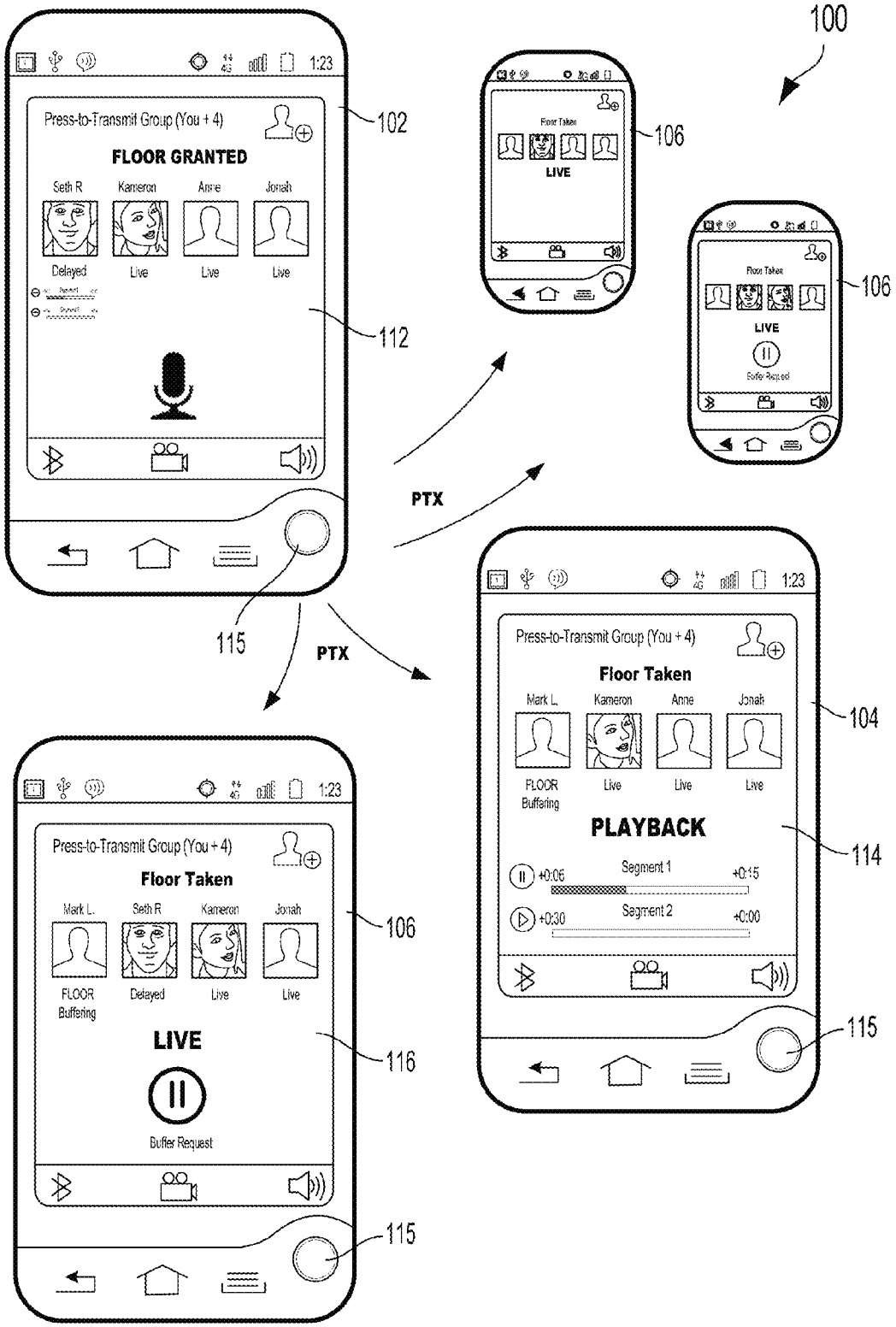
FIG. 2 illustrates a Press-to-Transmit (PTX) group of wireless communication devices displaying example user interface images of various embodiments.

FIG. 2 illustrates a PTX communication group 100, including five PTX devices in various PTX states. At the instant illustrated in FIG. 2, a first PTX device 102 has a floor grant, a second PTX device 104 is playing back a buffered message segment from the current PTX session, and three other PTX devices 106 are outputting the live message segments generated by the first PTX device 102. Throughout the various embodiments, each PTX device 102, 104, 106 may include elements typically found on conventional PTX devices, such as displays 112, 114, 116 and controls 115. Also, some or all of the PTX group devices may have enhanced features as described herein. In other words, not all communication devices of the PTX group need to have the same functionality and/or enhanced capabilities. In various embodiments, the methods may be implemented using wireless communication devices that do not include dedicated PTX hardware, such as a PTX button or PTX-specific circuitry. Further, while the embodiment PTX communication group 100 includes all smart-phone style communication devices, the PTX devices may be any devices that through software and/or hardware are capable of communicating in a PTX network. Further, the displays 112, 114, 116 are shown as being similar touch-screen user interfaces, but are illustrated as displaying different features based on their PTX state in accordance with embodiments herein.

In order to be granted control of the PTX floor, the first PTX device 102 may initiate a floor request and after receiving a floor grant may start transmitting a message. In FIG. 2 the first PTX device 102 is shown as having the "FLOOR GRANTED," which means it received and currently maintains a floor grant. The second and third PTX devices 104, 106 are shown as having the "Floor Taken" which tells the users of those devices that the floor is in use by another member of the group. Additionally, the second PTX device 104 is shown as being in "PLAYBACK" mode, which is a novel PTX mode described herein. For playback mode, the message transmitted by the first PTX device rather than being output immediately was stored in a buffer. Prior to the point in time shown in FIG. 2, the second PTX device 106 indicated it was not ready to output PTX messages and made a buffer request. The buffer request, if granted, stores one or more message segments generated by the PTX device with the floor grant and allows the requesting PTX device to play them back after a delay. The delay may be a predetermined amount of time or may be as long as the requesting device needs to get ready to begin outputting the buffered segments. At the point in time shown in FIG. 2, the second PTX device has started playback of the first of two message segments stored in its buffer. Three other PTX devices 106 are also shown outputting the first PTX device's message "LIVE," similar to a traditional PTX output mode. Further aspects of the different PTX modes are described further below.

FIGS. 3-7 are screenshot illustrations of touch-screen user interfaces of exemplary PTX devices. The wireless communication devices exemplified by the screenshots may include a display that provides visual feedback of the participation state of one or more devices in a PTX communication. In various embodiments, the wireless communication devices may display visual feedback that indicates the users from a group that are available to participate in a group communication as well as which users from the group are not available. In various embodiments, the wireless communication devices may also display the status of one or more users not available to participate in live group communication.

Figure 3:
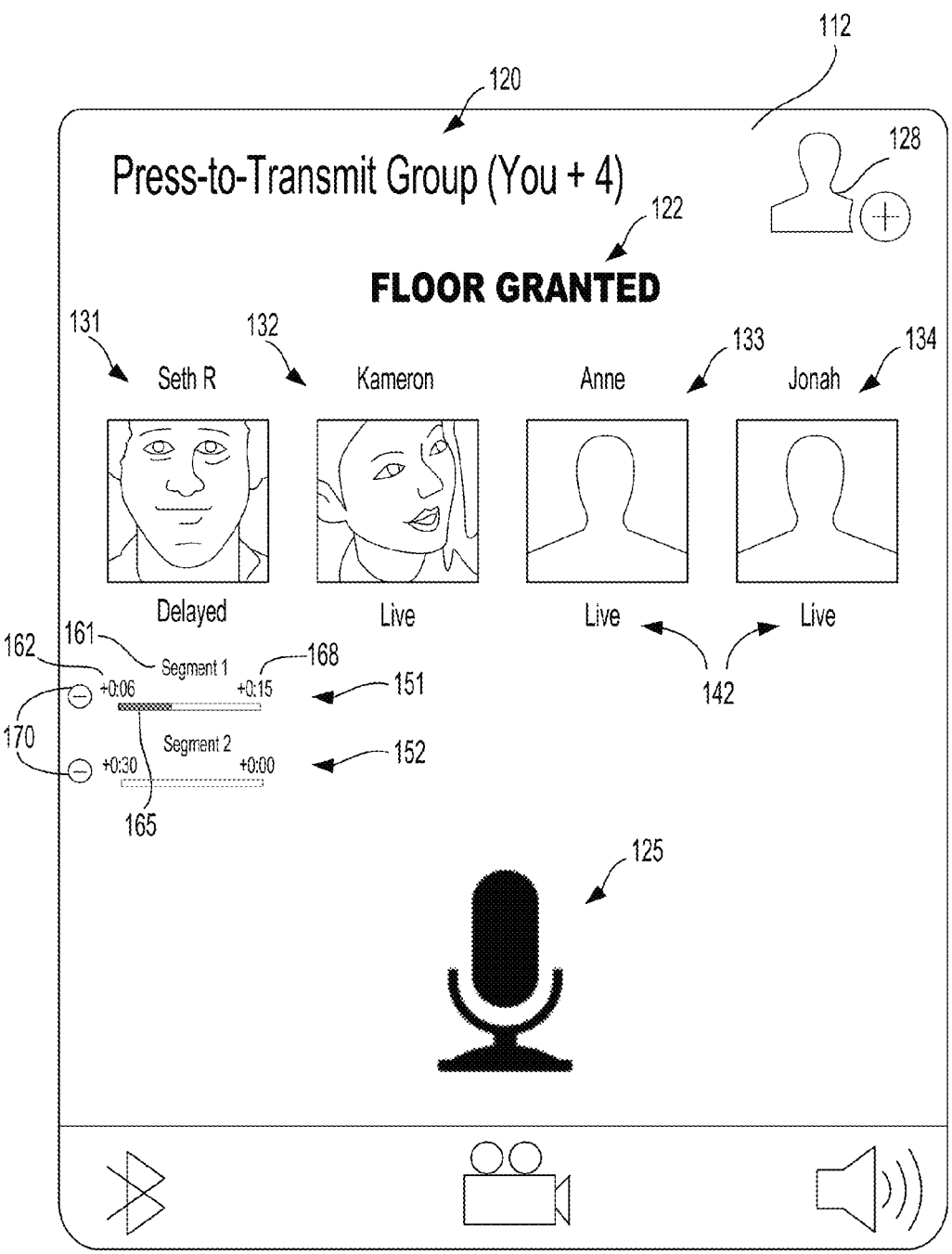
FIG. 3 is a screenshot of a touch-screen display of an originating PTX device illustrating an embodiment PTX communication session.

FIG. 3 illustrates a screenshot from the first PTX device 102, which is an originating PTX device. There are various indicators on the device display 112 providing visual feedback regarding the current PTX session. The session name field 120 shows the rather generic "Press-to-transmit Group" as a name for the session. Also, the session name field 120 may include additional information, such as the number of PTX session participants. In this illustrative example, the indication of "(You+4)" means a total of 5 PTX group members are participating in the current active session. Further enhanced features may be provided, such as a participant add-on icon 128 for adding further PTX group members. The session role field 122 provides information about whether a participant has a floor grant or not. In this example, the indication of "FLOOR GRANTED" demonstrates to the user or anyone viewing that device that the first PTX device 102 currently has a floor grant. Additionally, to give the user of the first PTX device 102 a further reminder that they are being heard by the rest of the PTX group, a further status icon 125 is provided in the form of a microphone. In this way, the display 112 lets the user know their current role in the PTX session in more than one way and on more than one part of the screen. Alternatively, in a full duplex environment or where more than one PTX group member is allowed to be active in transmitting communications at the same time, the session role field 122 may be changed accordingly. In this way, PTX group members may be given priority levels and more than one group member may be allowed to communicate simultaneously depending on their priority level. For example note FIG. 20 and FIG. 21 where the session role field 122 indicates "PRIORITY GRANTED," which means that device has priority over others in the communication group. That priority may be shared, depending on the setup, but the session role field 122 may be used to indicate that priority status to a user. Below the session role field 122 are icons and indicators regarding some or all of the session participants. In this illustrative example, the four other participants (those other than the user of PTX device 102) are represented. The first recipient PTX participant 131 includes a portion of his name (i.e., Seth R) and an image. Such an image need not be a likeness of the respective participant, but rather may be an avatar or image of any sort, as are commonly used with on-line social networks. The second recipient PTX participant 132 also includes a portion of her name (i.e., Kameron) and an image. The third and fourth recipient PTX participants 133, 134 includes names (i.e., Anne and Jonah), but include a generic avatar meaning no custom image is available for those participants.

Below the participant images on the display 112 are session status indicators 142 describing the respective participants' status in accordance with embodiments disclosed herein. The second, third and fourth participants 132, 133, 134 are shown as having a session status of "Live," which means they are listening to communications from the originating PTX device holding the floor grant without substantial delay. In this case, those participants 132, 133, 134 are listening to live communications from the first PTX device 102. In contrast, the first participant 131 is indicated as being "Delayed." The 'Delayed" session status means that participant was not available and has requested buffering. A buffer request is well suited for when a particular user knows he/she is temporarily not able to listen or give their attention to the originating participant. Alternatively, a participant device may automatically transmit a buffer request under certain circumstances. For example, a PTX device may transmit a buffer request when it recognizes that it is in a very loud environment based on ambient noise levels measured by the device's microphone, such as when the sound level exceeds a threshold in which the user will not be able to hear well. As another example, a PTX device may transmit a buffer request when it recognizes that it is in a very quite environment like a library, again based on measured ambient sound levels sensed by the device's microphone, where the normal output from the device would be unwelcome. Regardless of whether the buffer request was user or device initiated, once a buffer request is made it may be granted, denied or even withdrawn after initially being granted. Also, such a grant or denial may be done automatically, based on predefined settings or manually by a user. In the illustrated example, Seth R's buffer request was granted. A granted buffer request means that the communications transmitted from the originating PTX device get stored in a memory buffer for subsequent playback. The communications may be broken-up into segments, so participants can recall (i.e., delete) select segments and allow others to be heard on a delay. The break-up of segments may be based on predefined time intervals, pauses in the originator's speech or some other measure.

Again, the memory buffer used to store the PTX message segments may be part of the originating PTX device, the buffer requesting recipient device, a server or some other element associated with the PTX group. In the example illustrated in FIG. 3, a playback status 151, 152 is shown for each of two stored PTX message segments. The first of the two PTX message segments 151 is illustrated in the process of being played back on the first participant's device 104. Each of the message segments may include further status indicators, such as a numbered label field 161, a played-back time field 162 and a yet-to-be-played time field 168. Also, a progress bar 165 may be provided to give a direct visual indicator of the portion of PTX message segment played and not played. Selection buttons 170 may also be provided for either accessing additional information about the segment or simply deleting the message segment from the memory buffer. In this way, the user of the first PTX device 102 may touch the screen on one of the selection buttons 170 (shown as a circle surrounding a minus sign) in order to delete that message segment. Alternatively, touching the selection buttons 170 may expand the display for that message segment, as described further below with regard to FIG. 5B-7.

Figure 4A:
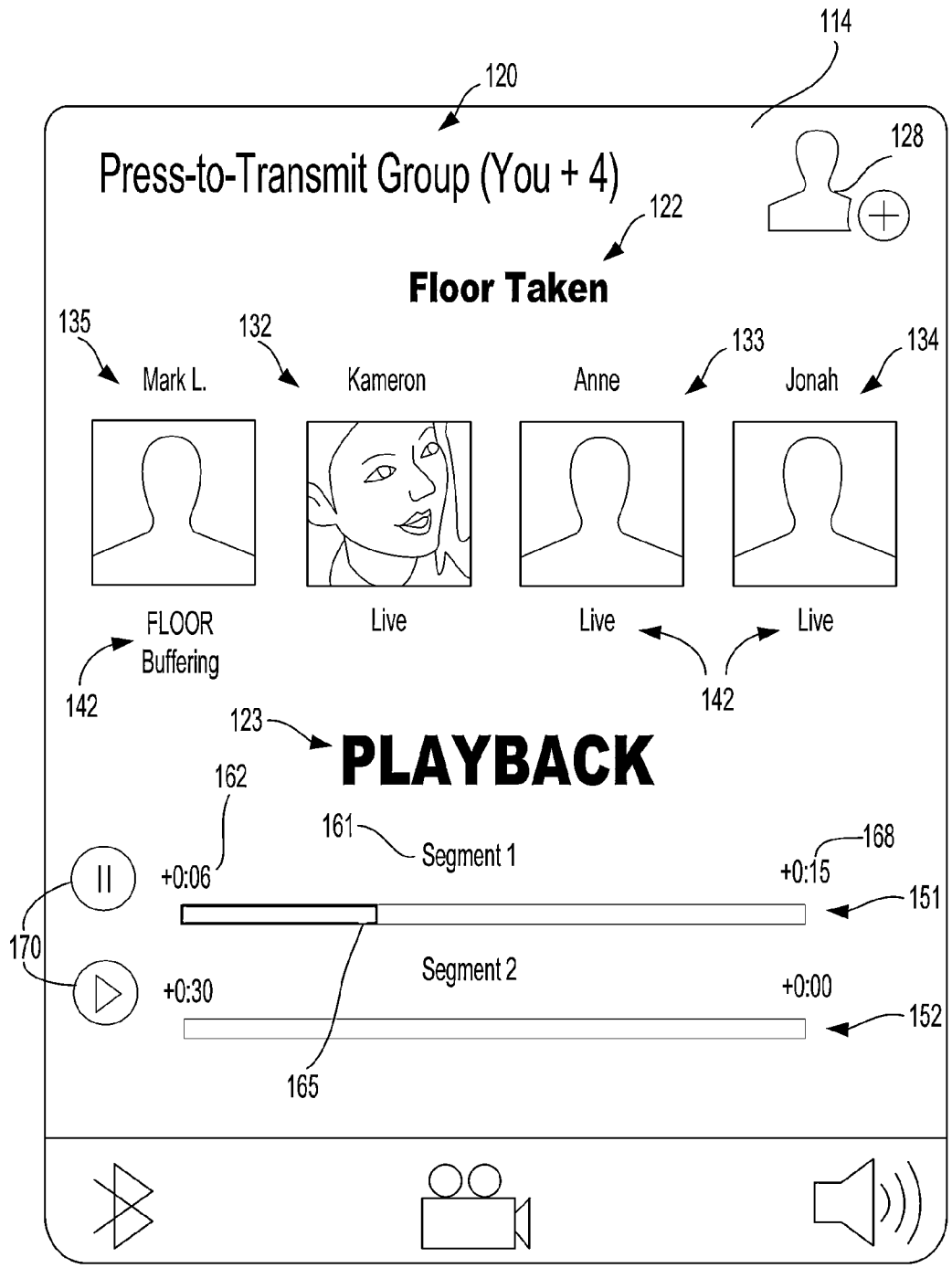
FIG. 4A is a screenshot of a touch-screen display of a recipient PTX device that made a buffer request illustrating an embodiment PTX communication session.

FIG. 4A illustrates a screenshot from the second PTX device 104, which in this example is operated by the first participant user 131 on a recipient PTX device. As with the first PTX device 102 described above, the device display 114 of the second PTX device 104 includes various visual indicators of the status of the current active PTX session. Namely, a session name field 120, an add participant icon 128, a session role field 122 and participant icons. This screenshot shows a slightly different group of PTX participants because the user of the second PTX device 104 does not need to be represented on its own display. In this illustration the originating PTX device user 135 (i.e., Mark L) is indicated. Not only may the originating PTX device be located in a prominent position, such as the left most position, but may also include a session status indicator 142 of "FLOOR" in order to reflect he has the floor grant. In this example the session status indicator 142 includes a further indication that the originating PTX device's message segments are "Buffering." This lets other users know the originating user is allowing buffering. Rather than the session status icon of a microphone used for the originating PTX device, as the second PTX device 104 is in the midst of playing back buffered message segments some form of media player may be provided. In the example, a caption 123 of "PLAYBACK" is also included, so the user of the second PTX device 104 is reminded of his current PTX status. Like the miniature media player used on the originating PTX device to represent the playback status, the larger version here may include a numbered label field 161, a played-back time field 162 a yet-to-be-played time field 168 and a progress bar 165. Preferably the playback status shown on the device playing back the buffer should be the same as that shown on the originating PTX device, although a minor time-lag may occur. In contrast to the selection buttons 170 on the originating PTX device, the selection buttons 170 on the recipient devices may include typical media player options such as "pause" (represented by the two vertical lines), "play" (represented by the triangle) or "stop" (represented by the square, which will halt a playback).

Figure 4B:
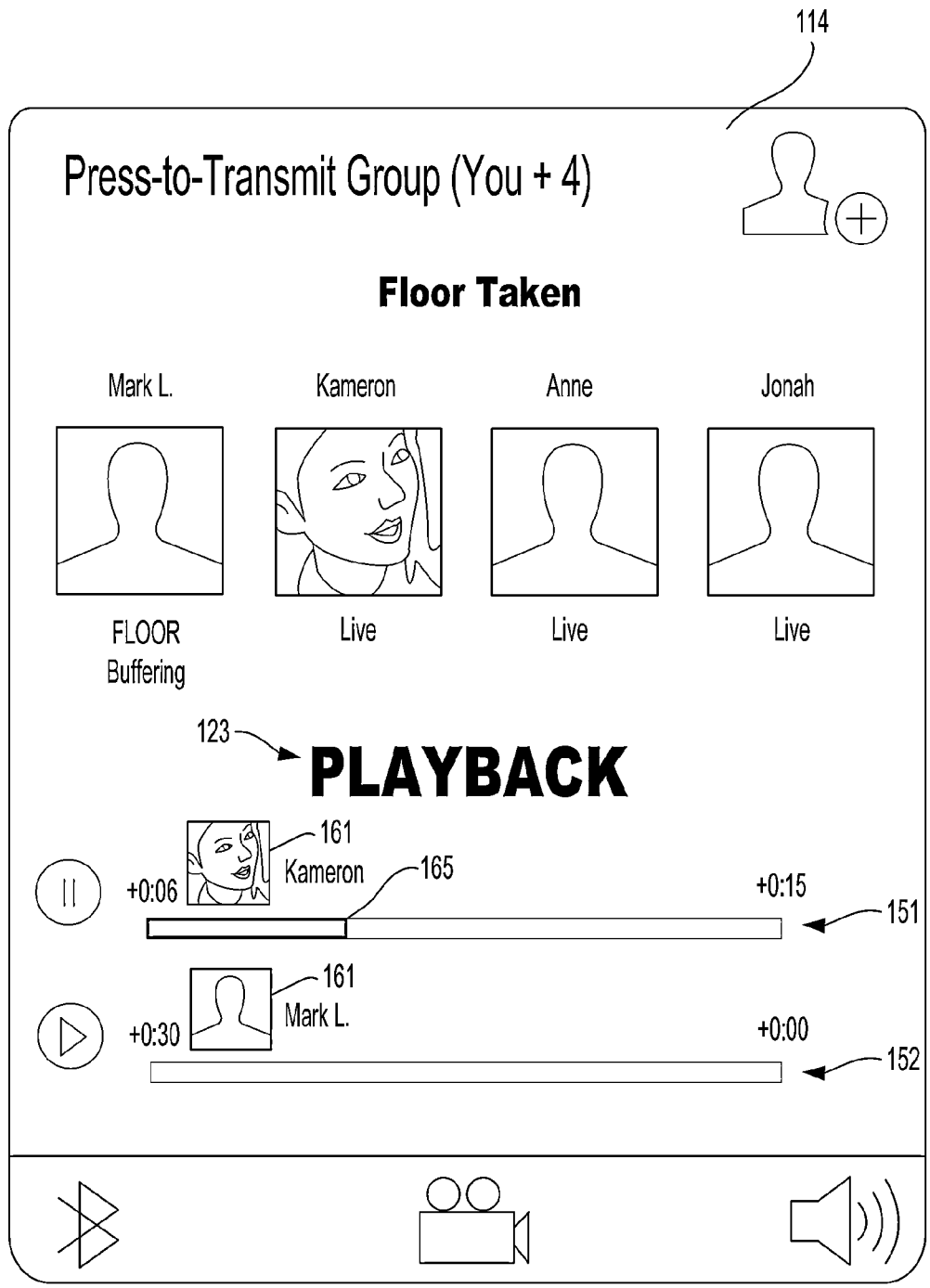
FIG. 4B is another screenshot of a touch-screen display of a recipient PTX device that made a buffer request illustrating an alternative embodiment PTX communication session.

FIG. 4B illustrates an alternative screenshot from the second PTX device 104, which in this example is operated by the first participant user 131 on a recipient PTX device. In this embodiment more than one message segment has been buffered, but those segments were generated by different PTX devices (i.e., transmitted from different group members). As with the illustrative example in FIG. 4A, in FIG. 4B the second PTX device 104 is in the midst of playing back a buffered message segment 151 (the first of two). Again, a caption 123 of "PLAYBACK" is also included, so the user of the second PTX device 104 is reminded of his current PTX status. A distinction in this embodiment is that the second message segment 152 is from the current originator holding a floor grant (Mark L.), whereas the first message segment 151 is from the second participant user 132 (Kameron). Since each message segment represents a different originator, the label field 161 includes a small version of the PTX group member image or icon and may even include their name or similar distinguishing indicator, as shown. It should be understood that each of those originators may have an indication on their own displays that their messages were buffered or are buffering, as described above with regard to FIG. 3.

Figure 5A:
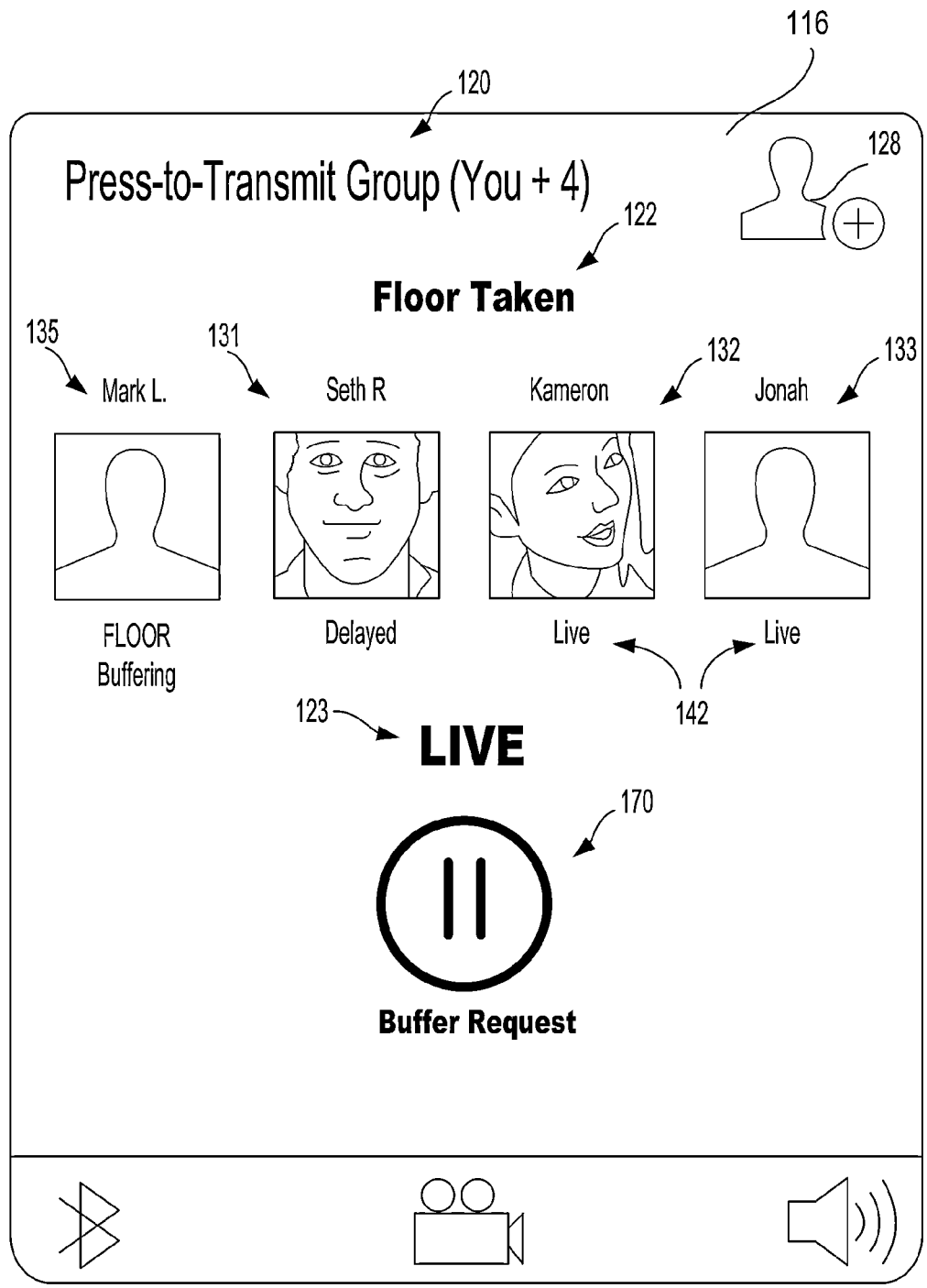
FIG. 5A is a screenshot of a touch-screen display of a recipient PTX device in live communications mode illustrating an embodiment PTX communication session.

FIG. 5A illustrates a screenshot from the third PTX device 106, which is the same as the fourth and fifth PTX devices in this example. The third, fourth and fifth PTX devices 106 represents recipient PTX devices receiving live communications from the originating PTX device. As with the first PTX device 102 and the second PTX device 104 described above, the device display 116 of the third PTX device 106 includes various visual indicators of the status of the current active PTX session. Namely, a session name field 120, an add participant icon 128, a session role field 122 and participant icons. This screenshot shows yet a different group of PTX participants as would be expected. Here the caption 123 shows "LIVE" reflecting that this participant is receiving live communications from the originating PTX device granted the floor. Also, in this example the only selection button 170 provided is for making a buffer request.

Figure 5B:
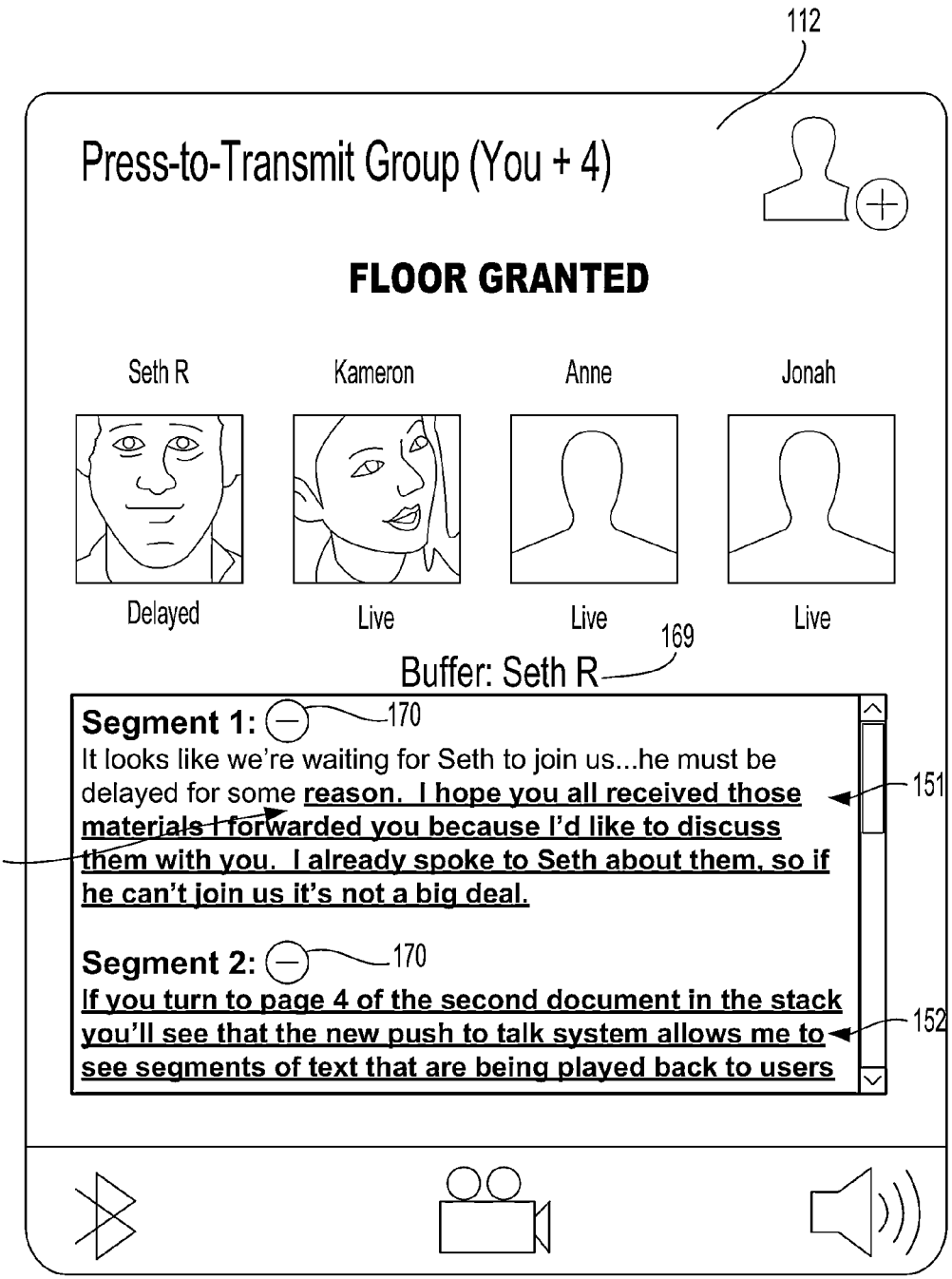
FIG. 5B is a screenshot of a touch-screen display of an originating PTX device illustrating a playback display detail for use with the various embodiments.

FIG. 5B illustrates a screenshot similar to that of FIG. 3, also of the first PTX device 102, but slightly modified. In FIG. 5B, the display 112 includes a playback status for one particular participant, namely Seth R, which is expanded to show more detail. As shown, the playback status includes a speech-to-text translation of the two message segments 151, 152. Although part of the second message segment 152 is cut-off, elements like the scroll bar on the right may be provided to allow the user to review the buffered message segments. Additionally shown is an enhanced playback status indication 166 representing the portion of the message segment that has been played back and that which has not been played back. The text illustrated with bold and underlining represents speech not yet played back on the delayed participant's device. Alternatively, color coding or some other differentiation may be used to distinguish and make clear the playback status.

Figure 6:
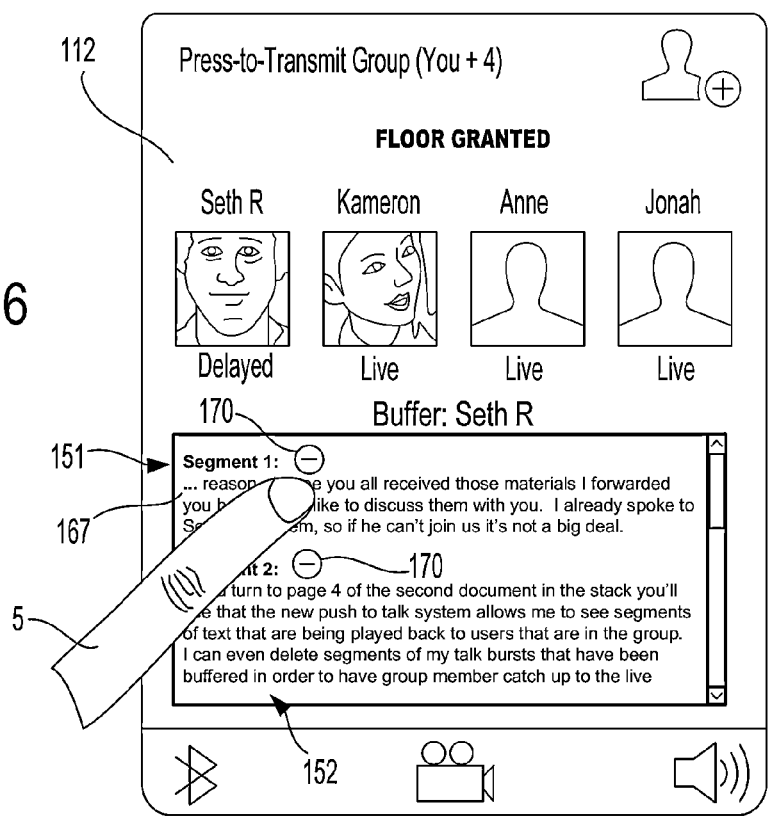
FIG. 6 is a screenshot of a touch-screen display of an originating PTX device illustrating another aspect of playback display detail for use with the various embodiments.
Figure 7:
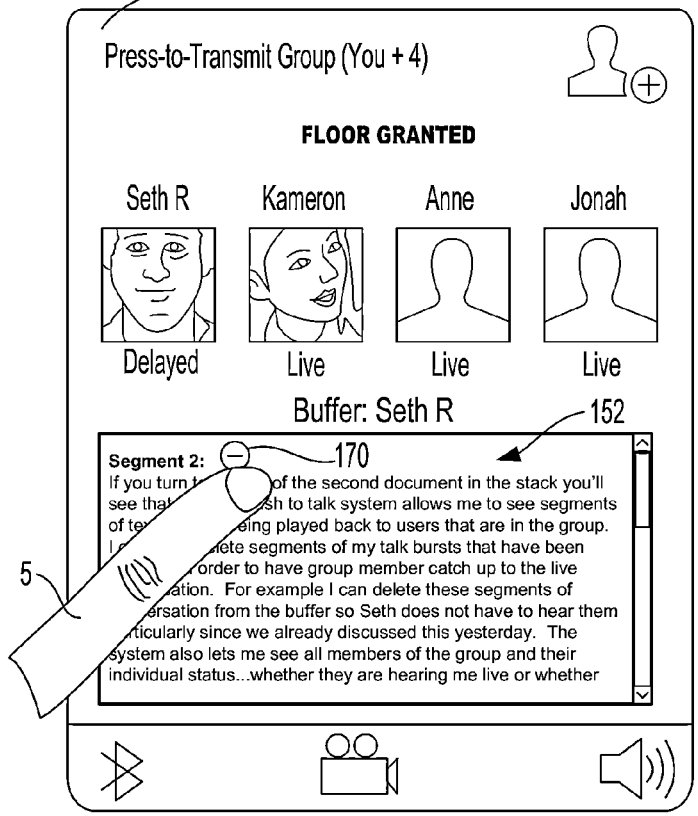
FIG. 7 is a screenshot of a touch-screen display of an originating PTX device illustrating a playback display detail similar to FIG. 6.

FIGS. 6 and 7 illustrate more screenshots similar to that of FIG. 3, also of the first PTX device 102, but slightly modified even from FIG. 5B. The embodiment in FIGS. 6 and 7 include an enhanced playback status indication 167 that simply deletes any text already played back. However, like the earlier screenshots, the selection buttons 170 are still available to delete selected message segments 151, 152. In FIG. 6, a user 5 is shown about to press the selection button 170 for the first message segment 151. This will result in the deletion of the remaining portion of the first message segment 151 and will look like the illustration of FIG. 7. Thereafter, the user 5 may optionally elect to press another selection button 170 to eliminate other portions of buffered message segments.

Figure 8:
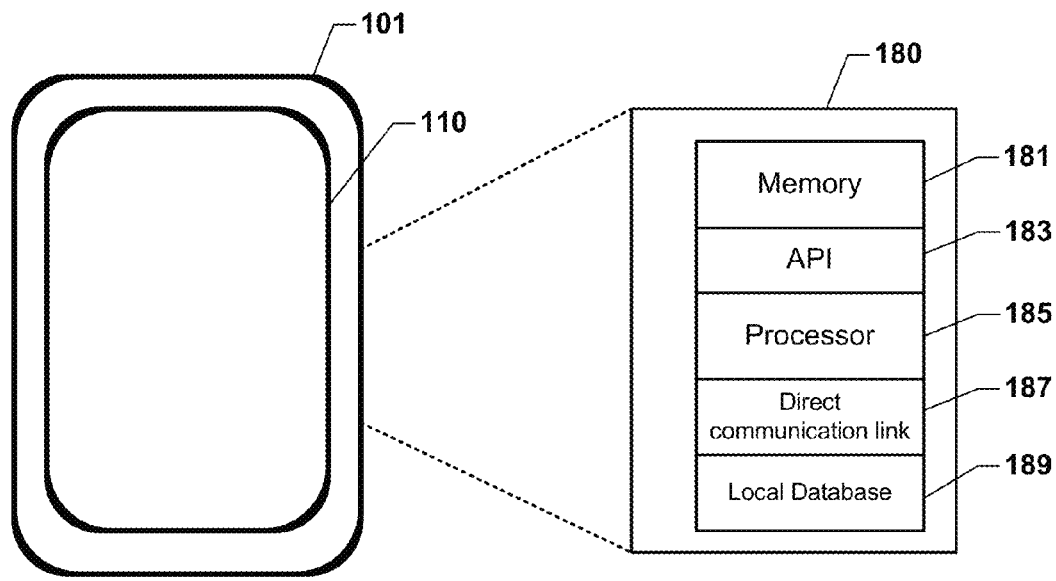
FIG. 8 is a schematic representation of a wireless communication device suitable for the various disclosed embodiments.

FIG. 8 shows a schematic diagram of a PTX device 101 usable in the various embodiments. The various PTX devices 102, 104, 106 described above may be substantially similar to PTX device 101. In various embodiments, each PTX device 101 provides individual members of the PTX group communications using software and native device hardware, such as a touch-screen display 110 and/or other user interfaces, such as a keypad interface. In various embodiments, the PTX methods described herein may be implemented on a wide range of devices, including most Internet-enabled mobile phones and other wireless communication devices. Also, the methods may be implemented using wireless communication devices that do not include dedicated PTX hardware, such as a PTX button or PTX-specific circuitry. Such a PTX device 101 may include a processor platform 180 that may handle voice and data packets, execute software applications, and transmit information across a wireless network. The processor platform 180 includes, among other components, a processor 185 such as an application-specific integrated circuit ("ASIC") or a RISC processor such as those that implement the ARM architecture. The processor 185 is typically installed at the time of manufacture of the wireless communication device 101 and is not normally upgradeable. The processor 185 or other processor executes an application programming interface ("API") layer 183, which includes the resident application environment, and may include the operating system loaded on the processor 185. The resident application environment interfaces with any resident programs in the memory 181, e.g., a computer readable storage medium of the wireless communication device 101.

As shown in FIG. 8, the wireless communication device 101 may be a wireless communication telephone, with a graphics display 110, but may also be any wireless device with a processor platform 180 as known in the art, such as a personal digital assistant (PDA), a pager with a graphics display 110, or even a separate processor platform 180 that has a wireless communication portal, and may otherwise have a wired connection to a network or the Internet. Further, the memory 181 may comprise read-only or random-access memory (RAM and ROM), EPROM, EEPROM, flash cards, or any memory common to processor platforms. The processor platform 180 may also include a local database 189 for storage of software applications not actively used in memory 181. The local database 189 is typically comprised of one or more flash memory cells, but may be any secondary or tertiary storage device as known in the art, such as magnetic media, EPROM, EEPROM, optical media, tape, or soft or hard disk. The graphics display 110 may present information about the ongoing group PTX call as is more fully described herein.

The processor platform 180 may also include a direct communication interface 187 that is configured to open a direct communication channel. The direct communication interface 187 may also be part of the standard communication interface for the wireless communication device 101 which ordinarily carries the voice, video and/or data transmitted to and from the wireless communication device 101. The direct communication interface 187 may comprise hardware as is known in the art. In the various embodiments, the software to enable PTX functionality in the wireless communication device 101 may be pre-installed in the device during device manufacture. Additionally or alternatively, at least a portion of the software providing PTX functionality may be downloaded to or otherwise installed on the device 101. As yet a further alternative, the PTX software or portions thereof may be a downloadable application (e.g., a mobile app).

Figure 9:
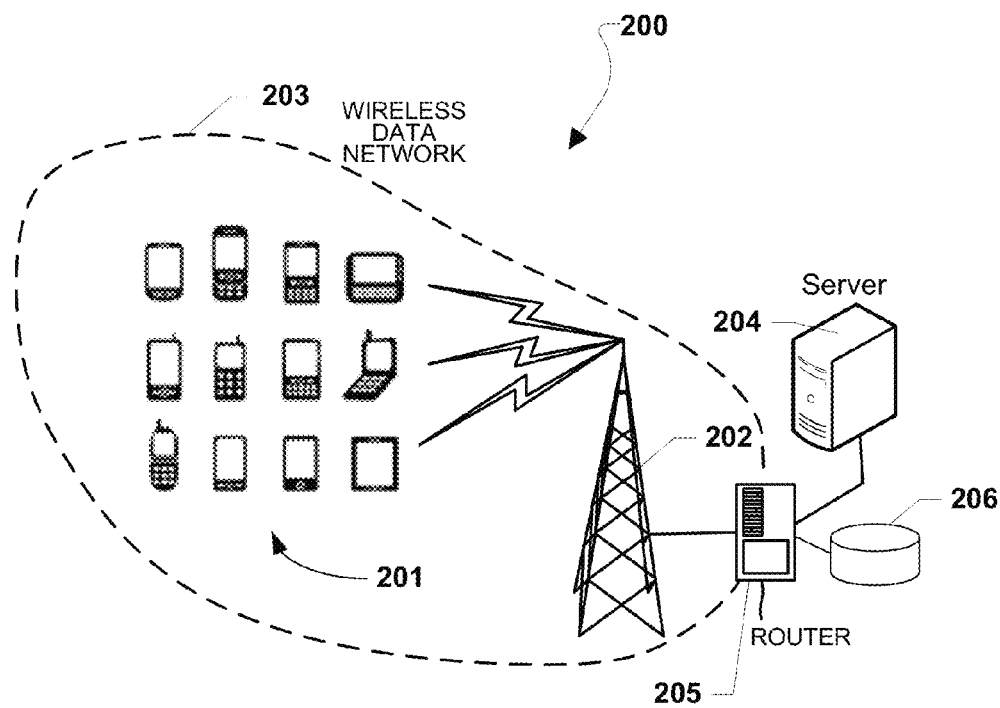
FIG. 9 is a schematic representation of a wireless data network with server suitable for the various disclosed embodiments.

FIG. 9 illustrates an example embodiment of a system 200 for managing PTX communications among one or more wireless telecommunication devices in a PTX group 201, such as one or more cellular telephones, smartphones, tablet computers, smart pagers, personal computers and personal digital assistants (PDA's), with other wireless communication devices. In the system 200, each wireless telecommunication device 201 may be capable of selectively communicating across the wireless communication network 203 with a target set of one or more other wireless telecommunication devices. The target set for wireless communication devices may be all devices in the communication group 201 or a subset thereof.

In an embodiment, the wireless telecommunication devices may individually communicate with the server 204, which is present on a server-side network, such as through a router 210, across the wireless data network 203. The server 204 may share information with a set of target wireless telecommunication devices designated by the originating PTX device or it may also share this with other computer devices accessible to the server 204, either across the wireless network 203 or another network. The server 204 may have an attached or accessible database 206 to store group data and/or buffer message segments. Also, some or all of the functions of the server 204, router 205 and database 206 may be combined in a single device.

In various embodiments, the server 204 may establish PTX channels between all or select devices in the group 201. Such communications may occur through, or at the control of, the server 204. However, all data packets of the devices do not necessarily have to travel through the server 204 itself, but in various embodiments the server 204 is preferably able to ultimately control the communication because it is typically the only or main server-side component that is aware of and/or can retrieve the identity of the members of the communication group, or direct the identity of the members of the communication group 201 to another computer device. A PTX channel may be established through a half-duplex channel (true or virtual) between the communicating wireless communication devices. The server 204 may also inform some devices in the group 201 when other members of that group cannot be reached or have requested a delay. Further, while the server 204 is shown here as having the attached database 206, the server 204 may have its own data storage and database functions.

In various embodiments, the server 204 may perform arbitration functions between competing demands of the various wireless communication devices 201 for use or control of PTX communication channels over the wireless network 203. For example, in response to a request from one wireless communication device to communicate with one or more other target devices in PTX group 201, the server 204 may establish a PTX channel between the requesting (originating) device and all or a portion of the requested target devices in group 201. The server 204 may thus grant control of the "floor" to the originating wireless communication device. When competing requests exist amongst devices of the group 201 for control of the "floor," the server 204 may arbitrate between competing requests based on pre-determined priority criteria. The priority criteria may be established at the time of the PTX group 201 formation, such as by a group administrator, and stored in server 204 and/or database 206.

In various embodiments, the server 204 may be configured to receive the data packages from the wireless communication devices (such as wireless communication devices 101, 102, 104, 106) and selectively permit members of the communication group 201 to receive the stored data packages across the wireless communication network 203. In an embodiment data packages may include, but are not limited to, pictures in JPEG, TIF, and the like, video files such as flash video, AVI, MOV, MP4, MPG, WMV, 3GP and the like, audio files such as MP3, MP4, WAV, and the like, documents, and/or presentations. The data packages may additionally include streaming media, such as a multimedia application (PowerPoint, MOV file, and the like). Also, the data packages may include half-duplex video conferencing among members of the communication group wherein the picture of the speaker may be broadcast to the other group members in substantial real-time, or in delay.

The system 200 may use the server 204 or database 206 to store data packets, including buffered message segments for target PTX devices to receive. Alternatively, such data packets may be stored locally at the originating PTX device and/or the recipient device(s). Upon receipt of data packages by individual members of the PTX group 201, the server 204 may be informed and in turn the server 204 may send an acknowledgement indicating to the originating PTX device which PTX group members have received such data packages and/or the status if the communication is not yet received by them or in progress.

The wireless data network 203 may include a series of communications servers that control communications between the wireless communication devices of the PTX group members in a PTX system. The wireless data network may include any system whereby remote modules communicate over-the-air between and among each other and/or between and among components of a wireless network, including, without limitation, wireless network carriers and/or servers. A series of communications servers may be connected to a group communication server. Such servers may be connected to a wireless service. The wireless network may control messages (generally in the form of data packets) sent to a messaging service controller.

Figure 10:
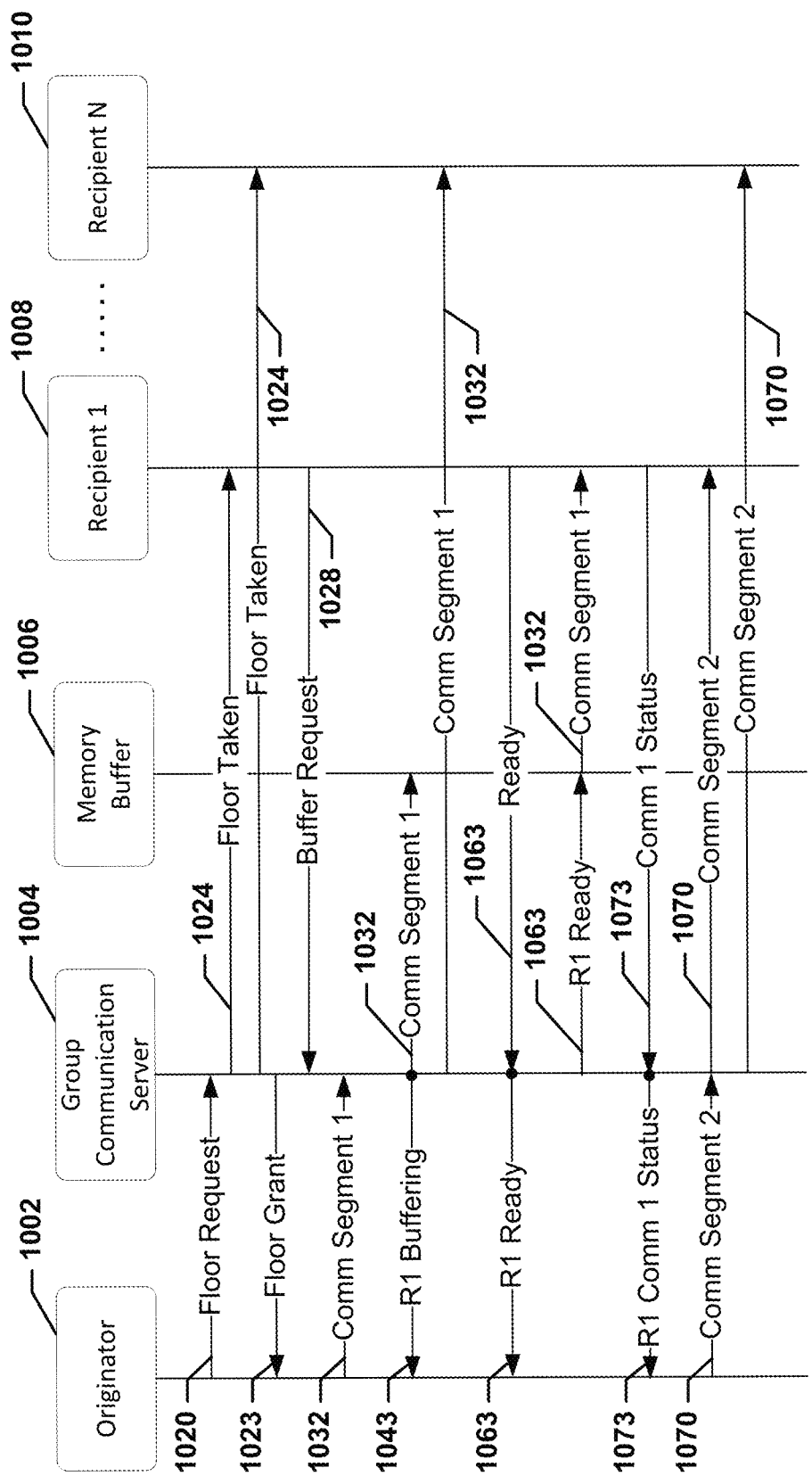
FIG. 10 is a communication flow diagram of an originator, a server, a memory buffer and PTX recipients according to an embodiment.
Figure 11:
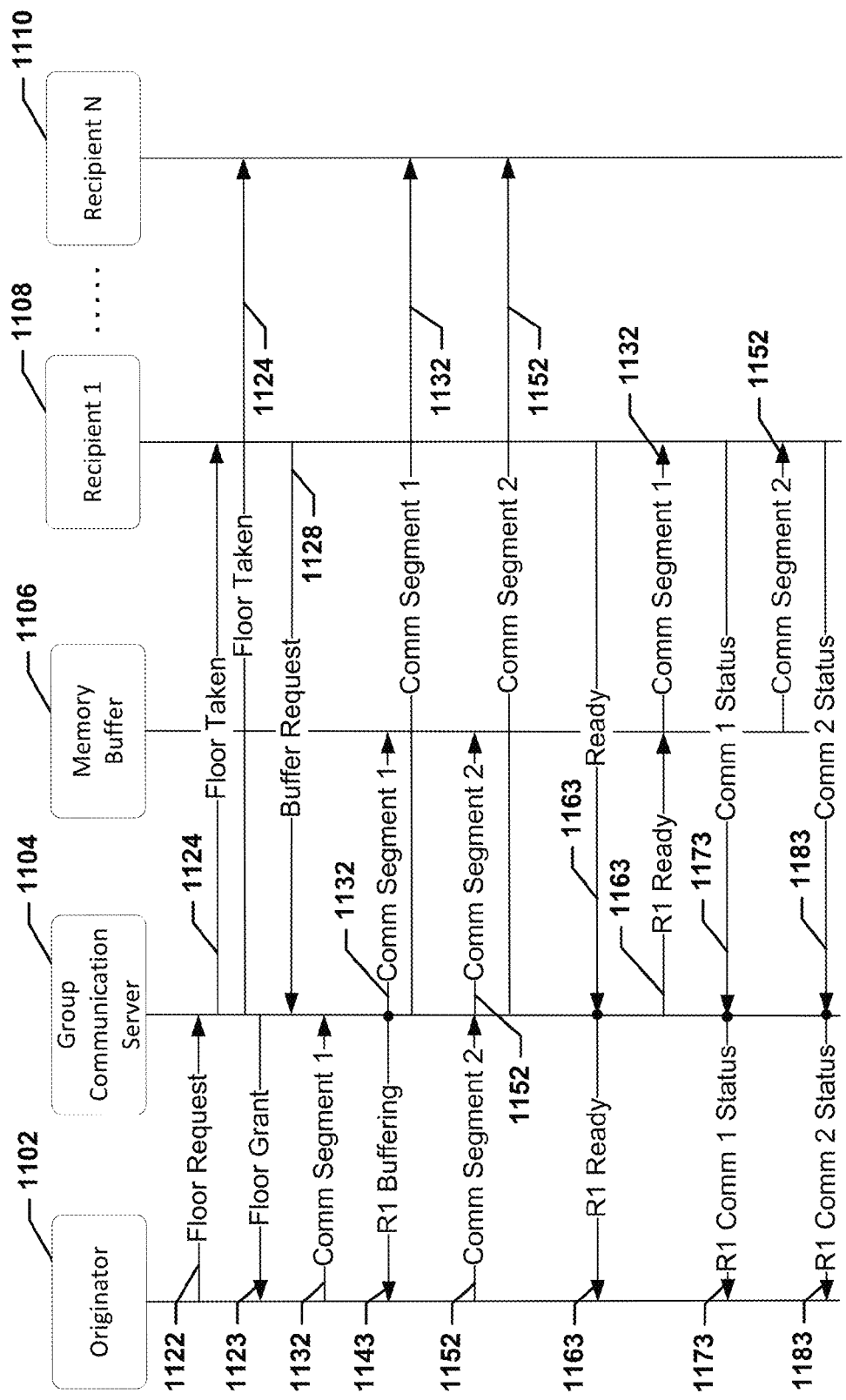
FIG. 11 is a communication flow diagram of an originator, a server, a memory buffer and PTX recipients according to another embodiment.
Figure 12:
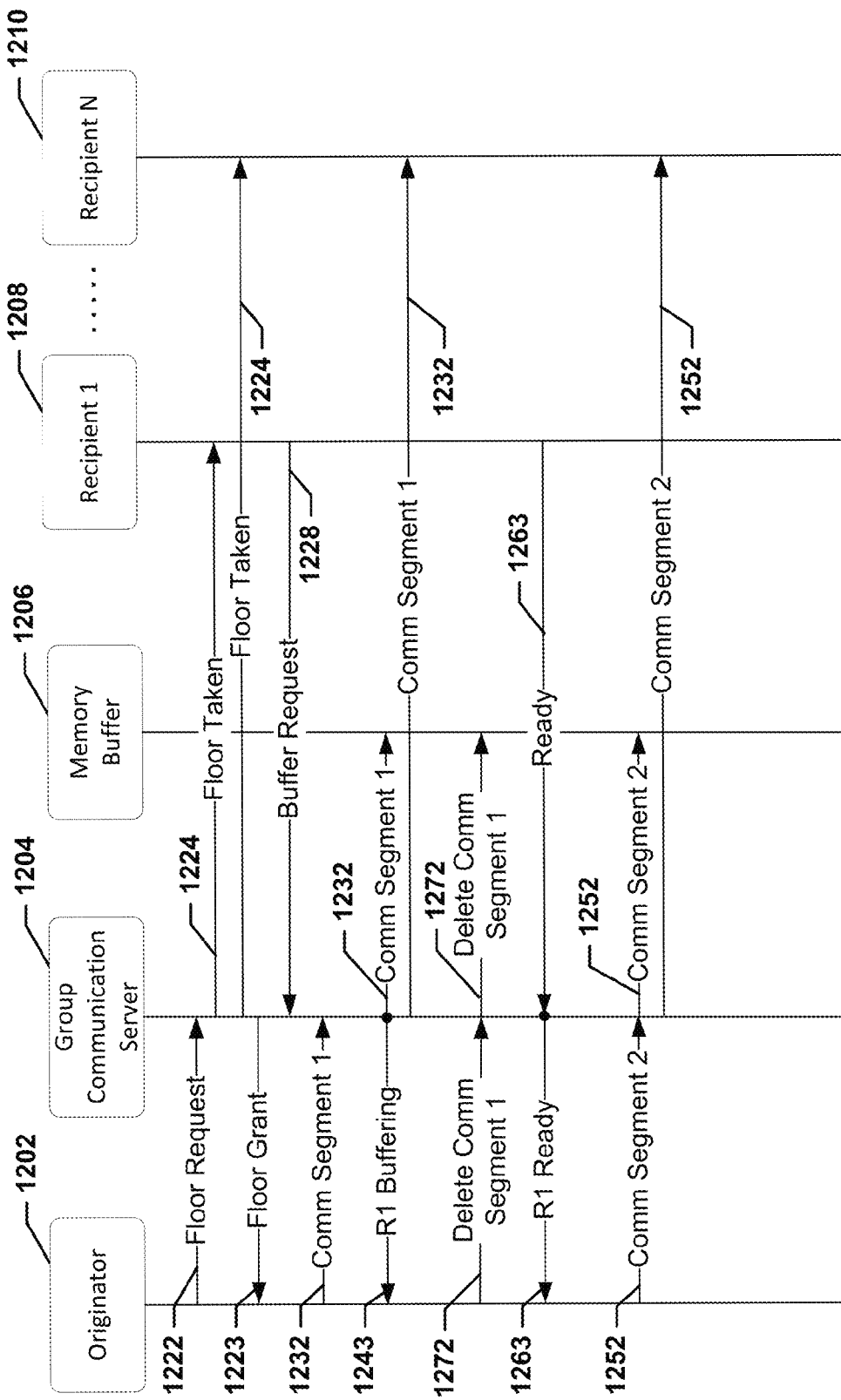
FIG. 12 is a communication flow diagram of an originator, a server, a memory buffer and PTX recipients according to yet another embodiment.

FIGS. 10-12 are communication flow diagrams illustrating example interactions between PTX devices, a network server and a memory. FIG. 10 illustrates communication flows starting at an originating PTX device 1002 (indicated as "Originator"). The communications also flow to a group communication server 1004 (also referred to as just "server"), a memory buffer 1006, a first recipient PTX device 1008 (indicated as "Recipient 1") and a group of additional recipients 1010 represented by the ellipsis and "Recipient N" (where the group of recipient PTX devices is numbered 1 to N, N being the last recipient PTX device). In this embodiment, a floor request 1020 is transmitted from the originator 1002 to the server 1004. After verifying and provisional PTX group members, the server 1004 may transmit a floor taken signal 1024 to the recipients 1008-1010. Also, the server 1004 may transmit a floor grant signal 1023 back to the originator 1002. A buffer request 1028 may then be transmitted from Recipient 1 1008 to the server 1004. Meanwhile, the originator 1002 may transmit a first communication segment 1032 ("Comm Segment 1") to the server 1004 for distribution to the recipients. Having received buffer request 1028, the server 1004 may transmit a buffer indication 1043 ("R1 Buffering") to the originator 1002. Also, the server 1004 may ensure the first communication segment 1032 is transmitted to the memory buffer 1006 for at least temporary storage. The first communication segment 1032 may also be transmitted to the other recipients 1010, since they did not transmit a buffer request. In this illustrative embodiment, the first recipient 1008 transmits a ready signal 1063 to the server 1004, which in-turn is transmitted the ready signal 1063 to the originator 1002. Thereafter, the server may access or transmit the ready signal 1063 the memory buffer 1006 in order to transmit or have the first communication segment 1032 transmitted to the first recipient 1008 who is now ready to receive it. As the first recipient 1008 plays back the first communication segment a playback status 1073 ("Comm 1 Status") may be transmitted to the server 1004, which is in-turn transmitted to the originator 1002. The originator 1002 at the end of this example transmits a second communication segment 1070 ("Comm Segment 2") to the server 1004 for distribution. With no buffer request active, the server transmits the second communication segment 1070 to all recipients 1008-1010. In this example, the second communication segment 1070, which is generated after the first communication segment 1032 is transmitted to the recipients after the playback of the first communication segment 1032 that was buffered.

FIG. 11 illustrates communication flows starting at an originating PTX device 1102 (indicated as "Originator"). The communications also flow to a group communication server 1104 (also referred to as just "server"), a memory buffer 1106, a first recipient PTX device 1108 (indicated as "Recipient 1") and a group of additional recipients 1110 represented by the ellipsis and "Recipient N" (where the group of recipient PTX devices is numbered 1 to N, N being the last recipient PTX device). In this embodiment, a floor request 1122 is transmitted from the originator 1102 to the server 1104. After verifying and provisional PTX group members, the server 1104 may transmit a floor taken signal 1124 to the recipients 1108-1110. Also, the server 1104 may transmit a floor grant signal 1123 back to the originator 1102. A buffer request 1128 may then be transmitted from Recipient 1 1108 to the server 1104. Meanwhile, the originator 1102 may transmit a first communication segment 1132 ("Comm Segment 1") to the server 1104 for distribution to the recipients. Having received buffer request 1128, the server 1104 may transmit a buffer indication 1143 ("R1 Buffering") to the originator 1102. Also, the server 1104 may ensure the first communication segment 1132 is transmitted to the memory buffer 1106 for at least temporary storage. The first communication segment 1132 may also be transmitted to the other recipients 1110, since they did not transmit a buffer request. In this embodiment before a ready signal is transmitted from the first recipient 1108, the originator 1102 transmits a second communication segment 1152 ("Comm Segment 2") to the server 1104. With the buffer request from the first recipient 1108 still active, the server 1104 may ensure the second communication segment 1152 is transmitted to the memory buffer 1106 for at least temporary storage. The second communication segment 1152 may also be transmitted to the other recipients 1110, since they did not transmit a buffer request. The first recipient 1108 may subsequently transmit a ready signal 1163 to the server 1104, which in-turn transmits the ready signal 1163 to the originator 1102. Thereafter, the server may access or transmit the ready signal 1163 the memory buffer 1106 in order to transmit or have the first communication segment 1132 transmitted to the first recipient 1108 who is now ready to receive it. As the first recipient 1108 plays back the first communication segment 1132, the first recipient 1108 may transmit a playback status 1173 ("Comm 1 Status") to the server, which may then transmit that playback status 1173 to the originator 1102. Also, the server may subsequently transmit or have the second communication segment 1152 transmitted to the first recipient 1108 who is now ready to receive it. As the first recipient 1108 plays back the second communication segment 1152, the first recipient 1108 may transmit a second playback status 1183 ("Comm 2 Status") to the server, which may then transmit that playback status 1183 to the originator 1102. In this example, the second communication segment 1152, which is generated after the first communication segment 1132 is transmitted to the recipients before the playback of the first communication segment 1132 that was buffered.

FIG. 12 illustrates communication flows starting at an originating PTX device 1202 (indicated as "Originator"). The communications also flow to a group communication server 1204 (also referred to as just "server"), a memory buffer 1206, a first recipient PTX device 1208 (indicated as "Recipient 1") and a group of additional recipients 1210 represented by the ellipsis and "Recipient N" (where the group of recipient PTX devices is numbered 1 to N, N being the last recipient PTX device). In this embodiment, a floor request 1222 is transmitted from the originator 1202 to the server 1204. After verifying and provisional PTX group members, the server 1204 may transmit a floor taken signal 1224 to the recipients 1208-1210. Also, the server 1204 may transmit a floor grant signal 1223 back to the originator 1202. A buffer request 1228 may then be transmitted from Recipient 1 1208 to the server 1204. Meanwhile, the originator 1202 may transmit a first communication segment 1232 ("Comm Segment 1") to the server 1204 for distribution to the recipients. Having received buffer request 1228, the server 1204 may transmit a buffer indication 1243 ("R1 Buffering") to the originator 1202. Also, the server 1204 may ensure the first communication segment 1232 is transmitted to the memory buffer 1206 for at least temporary storage. The first communication segment 1232 may also be transmitted to the other recipients 1210, since they did not transmit a buffer request. In this embodiment, before the first communication segment 1232 is played back, the originator 1202 may transmit a delete signal 1272 to the server 1204 indicating that the buffered first communication segment 1232 should be deleted. The delete signal 1272 may then be transmitted to the memory buffer 1206 in order to effect the deletion of the first communication segment 1232. Subsequently becoming ready, the first recipient 1208 may transmit a ready signal 1263 to the server 1204, which in-turn transmits the ready signal 1263 to the originator 1202. The originator 1202 at the end of this example transmits a second communication segment 1270 ("Comm Segment 2") to the server 1204 for distribution. With no buffer request active, the server transmits the second communication segment 1270 to all recipients 1008-1010. In this example, the second communication segment 1270, which is generated after the first communication segment 1032 is transmitted to the recipients after the first communication segment 1032 was deleted from the memory buffer 1206.

Figure 13:
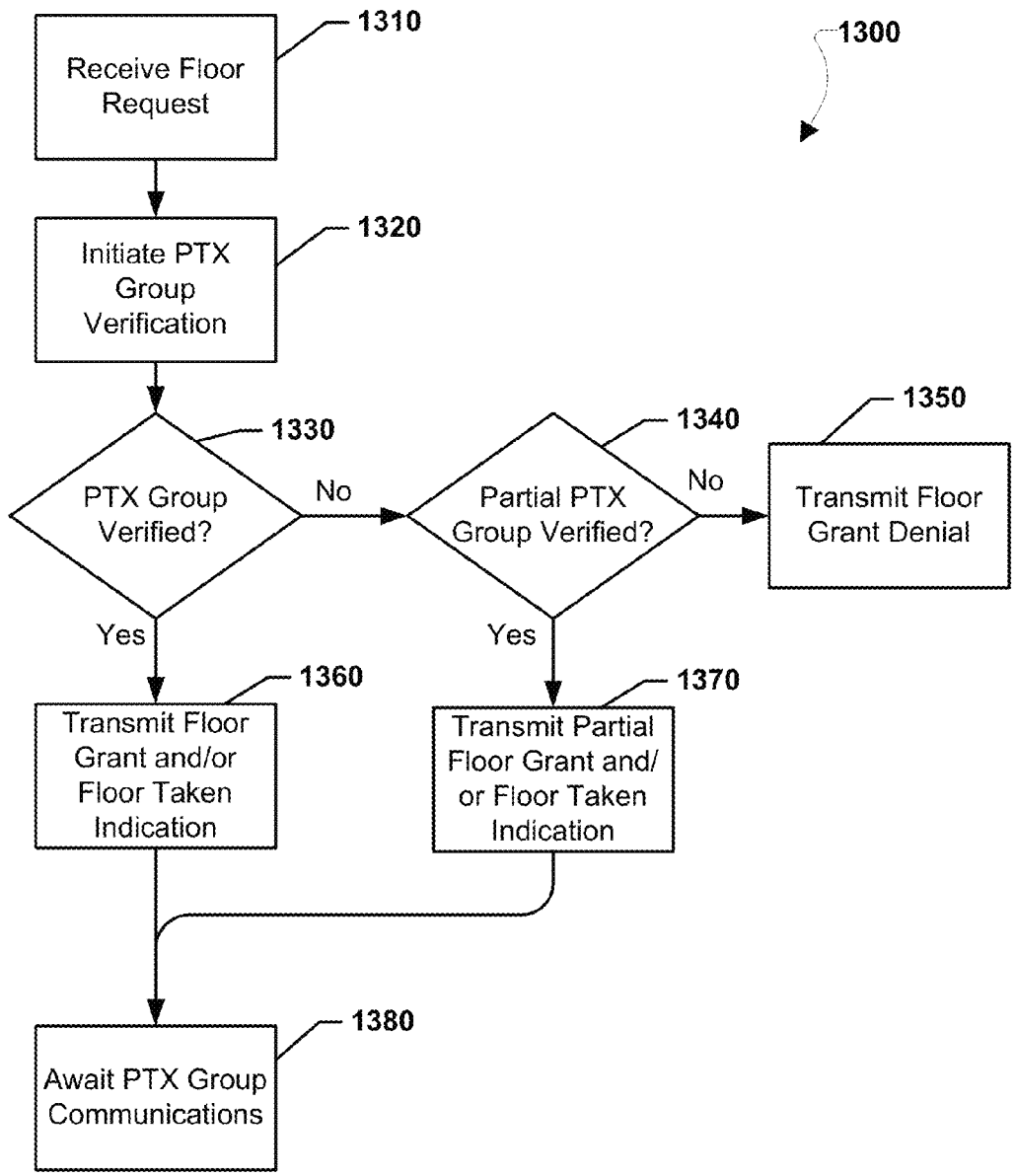
FIG. 13 is a process flow diagram of an embodiment method of managing PTX communications.

FIG. 13 is a process flow diagram illustrating an embodiment method 1300 of managing PTX communications between PTX devices using a server. The method 1300 relates to initially establishing or attempting to establish a PTX group communication session. In block 1310, the server may receive a floor request for a PTX session from an originating PTX device, as described above. In block 1320, the server may initiate PTX group verification, which may include confirming that all PTX group members may be reached and/or any provisioning necessary to establish PTX communications is performed. In block 1330, the server may determine whether the desired PTX group is ready to communicate. If the PTX group is verified (i.e., determination block 1330=Yes), in block 1360 the server may transmit a floor grant indication to the originating PTX device, as well as transmit a floor taken indication to the other PTX group members. When the floor is granted, the server may transmit audio and/or visual features indicating as much to PTX group members, including the originating PTX device. As discussed above, these visual features may include a display of words or symbols representative of this state. It will be understood that in addition to the visual feedback cues described herein, other feedback cues, such as audio or haptic cues, can also be employed to indicate the state of the group communication. If the PTX group is not verified (i.e., determination block 1330=No), the server may determine whether part of the desired PTX group is ready to communicate. If a partial PTX group is verified (i.e., determination block 1340=Yes), in block 1370 the server may transmit a partial floor grant indication to the originating PTX device, as well as transmit a floor taken indication to the other available PTX group members. The partial floor grant may similarly include audio and/or visual features and may be somewhat different than the full floor grant, so all group members are aware of who is present. After a full or partial floor grant is indicated in block 1380 the server may away PTX group communications, such as one or more message segments from the originating PTX device and/or a buffer request from other PTX group members. If not even a partial PTX group may be verified (i.e., determination block 1340=No), the server may transmit a floor grant denial indicating the floor could not be granted.

Figure 14:
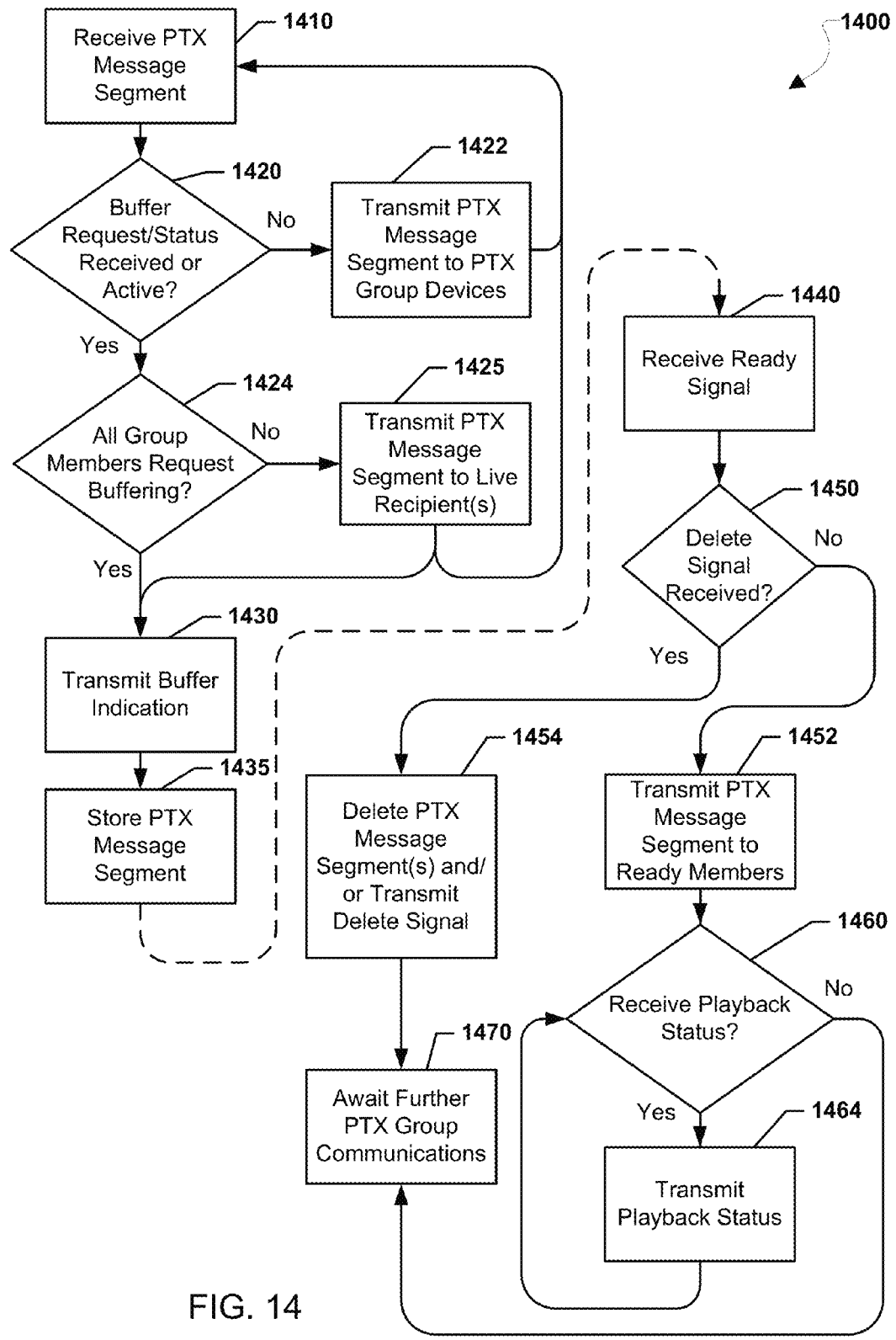
FIG. 14 is a process flow diagram of another embodiment method of managing PTX communications.

FIG. 14 is a process flow diagram illustrating an embodiment method 1400 of managing PTX communications between PTX devices using a server. The method 1400 relates to handling PTX group communications once an originating PTX device has been assigned a floor grant or a partial floor grant in the event not all PTX group members are available. In block 1410, the server may receive a PTX message segment. In determination block 1420 the server may determine whether a buffer request or buffer status has been received and if one has been received is it still active. The buffer request and/or buffer status may have been received from one or more of the recipient PTX devices of the PTX group. The buffer request represents an indication from the recipient PTX device(s) that the PTX message segment needs to be stored for delayed playback. In contrast, a buffer status represents an indication that the PTX message segment is stored, is being stored or will be stored. Thus, if no buffer request or buffer status has been received (i.e., determination block 1420=No), the server may transmit in block 1422 the received PTX message segment to all the PTX group devices. Similarly, even if a buffer request was previously received it may no longer be active. For example, a recipient device after initially sending a buffer request may subsequently be ready to receive communications and be caught-up in terms of playing back prior buffered message segments. That recipient device may then indicate this ready and caught-up state to the server, making the prior buffer request no longer active. That recipient device would then be included in the distribution of the PTX message segment in block 1422. If at least one buffer request is received and still active (i.e., determination block 1420=Yes), the server may determine in block 1424 whether all PTX group members have requested buffering. If at least one member has not requested buffering or is not actively requesting buffering (also referred to as a "live recipient"), in block 1425, the server may transmit the received PTX message segment to the live recipient(s).

From block 1425, the process flow may split because two categories of recipients exist; one category being the live recipients directly receiving new PTX message segments without significant delay if they do not request buffering, and the other category being the buffering or delayed recipients that have a buffer request active. In order to further manage PTX communications for the live recipients, the process may return to block 1410 to received further PTX message segments for that group. Also, in order to manage PTX communications for the delayed recipients, the process may simultaneously or contemporaneously transmit in block 1430 a buffer indication to the originating PTX device. Alternatively, if all group members are determined to have requested buffering (i.e., determination block 1424=Yes), in block 1430 the server may similarly transmit a buffer indication to the originating PTX device. The buffer indication may reflect the fact that the buffer request has been received and from which of the recipient PTX devices it was received. In conjunction with transmitting a buffer request, in block 1435 the PTX message segment may be stored by the server. Storing of message segments may be done locally at the server or at a remote network memory storage element available to the server for the purpose. Alternatively, the storage of the PTX message segment may occur at either the originating PTX device or the PTX group member device requesting the buffering, as described further below.

Once one or more PTX message segments have been stored, the server may receive in block 1440 a ready signal. The ready signal may indicate a recipient PTX device that previously transmitted a buffer request is ready to output PTX message segments. Alternatively, the server may not receive a ready signal from a recipient device prior to the close of the PTX communication session, in which case the process need not proceed to block 1440. However, if a ready signal is received, the server may then determine or previously have determined in block 1450 whether a delete signal has been received from the originating PTX device. The delete signal represents the fact that the originating PTX device does not want the delayed playback of the one or more buffered PTX message segments. If a delete signal has been received (i.e., determination block 1450=Yes) one or more PTX message segments may be deleted in block 1454 or the server may transmit a delete signal for the stored PTX message segment to be deleted. In block 1470, the server may await further PTX group communications. For example, in block 1470 from block 1454 the process may revert to block 1410, ready to receive further PTX message segments or alternatively receive a floor request from another PTX device (reverting to the method 1300 described above). However, if a delete signal has not been received (i.e., determination block 1450=No), in block 1452 the server may transmit the previously stored PTX message segment to the one or more recipient PTX devices from which ready signals were received in block 1440.

In the various embodiments, when one or more buffered (i.e., stored) PTX message segments are being played back on a recipient PTX device, a status of the playback may be reported to the server, as well as the PTX device that originated the message. In this way, in determination block 1460 the server may determine whether a playback status has been received from the ready members who received a PTX message segment in block 1452. If a playback status is received (i.e., determination block 1460=Yes) in block 1464 the playback status may be transmitted to the originating PTX device and optionally the other member devices of the PTX group. Alternatively, if no playback status is received (i.e., determination block 1460=No), the server may await further PTX group communication in block 1470. As noted for block 1470 above, the process may thereafter revert to block 1410, ready to receive further PTX message segments or alternatively receive a floor request from another PTX device.

Figure 15:
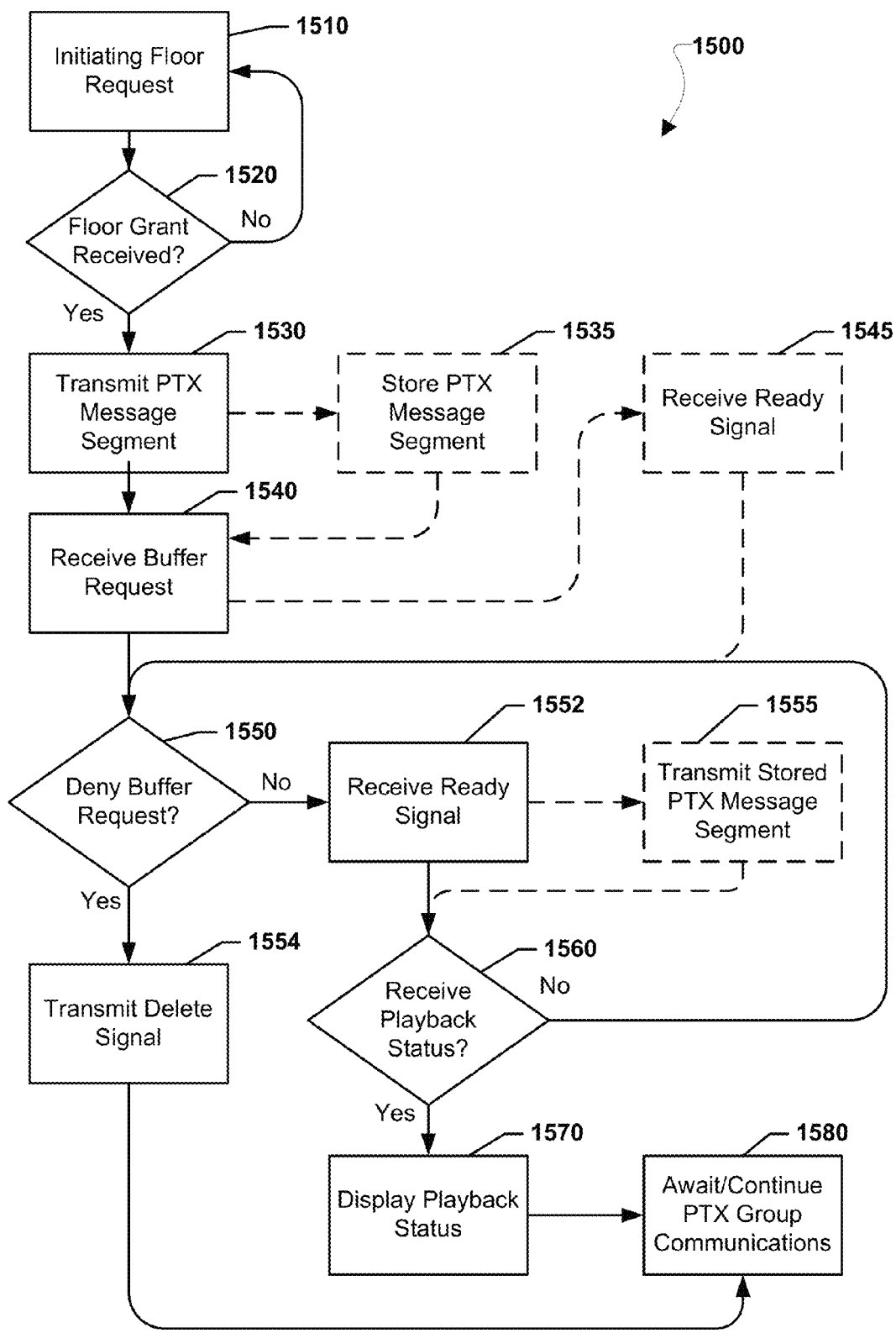
FIG. 15 is a process flow diagram of an additional embodiment method of managing PTX communications.

FIG. 15 is a process flow diagram illustrating an embodiment method 1500 of managing PTX communications between PTX devices from the perspective of an originating PTX device. In block 1510 an originating PTX device may initiate a floor request, similar to contemporary PTX methods. If a floor grant is not received (i.e., determination block 1520=No) and a floor taken indication is also not received (indicating someone else has the floor), then the originating PTX device may again initiate a floor request in block 1510. Once a floor grant is received (i.e., determination block 1520=Yes), in block 1530 the originating PTX device may transmit one or more PTX message segments. In an embodiment, buffered message segments may be stored locally at the originating PTX device. Thus, in order to accomplish this alternative, in block 1535 the PTX message segment is stored. If no buffer request is ever received, the PTX communication may proceed like contemporary PTX systems. However, in accordance with the various embodiments, in block 1540 a buffer request may be received. It should be noted that any PTX group devices not wanting buffering may simply receive the transmitted PTX message segment as a live broadcast. Also, the originating PTX device may be notified as to which devices are receiving the message segments live. Alternatively, the originating PTX device may assume any device that did not request buffering is receiving the message segments, unless notified otherwise from the server.

In an embodiment, the buffer request may be denied (i.e., determination block 1550=Yes), which means the originating sender does not wish recipients to playback buffered message segments. Thus, in order to prevent such playback a delete signal may be transmitted to the server. If the originating PTX device stored the message locally in block 1535 then that stored message segment may be deleted, along with a notification regarding the deletion being transmitted to the server in block 1554. In block 1580, the originating PTX device may either relinquish the floor and await PTX group communications from others or continue transmitting one or more PTX message segments, thus reverting to block 1530.

If the buffer request is not denied (i.e., determination block 1550=No) previously stored PTX message segments may be played back at recipient PTX devices once they are ready to do so. Thus, in block 1552 the originating PTX device may receive a ready signal indicating one or more recipient PTX devices are ready to output the stored PTX message segment(s). If a message segment was stored locally in block 1535, in block 1555 the stored message segment may once again be transmitted. In this way, the delayed recipient PTX devices may playback the one or more message segments they missed.

In an embodiment, a playback status may be reported to the originating PTX device and/or the PTX group members. Thus, as delayed recipient PTX devices playback the previously stored PTX message segment, a playback status may be provided to the originating PTX device. If a playback status is received (i.e., determination block 1560=Yes), in block 1570 that playback status may be displayed on the originating PTX device. As discussed above, the playback status may be a simple progress bar, an audible indication or even a speech-to-text translation of at least a portion of the PTX message segment played back. Also, the speech-to-text translation displayed on the originating PTX device may reflect an updated playback status of what portion of the first PTX message segment has not been output from the first recipient PTX device. In an embodiment, the originating PTX device may be able to cut-off or terminate the playback by transmitting a delete signal, as described above with regard to block 1554. Regardless, once the playback is concluded or terminated, the originating PTX device may in block 1580 either relinquish the floor and await PTX group communications from others or continue transmitting one or more PTX message segments, thus reverting to block 1530.

Figure 16:
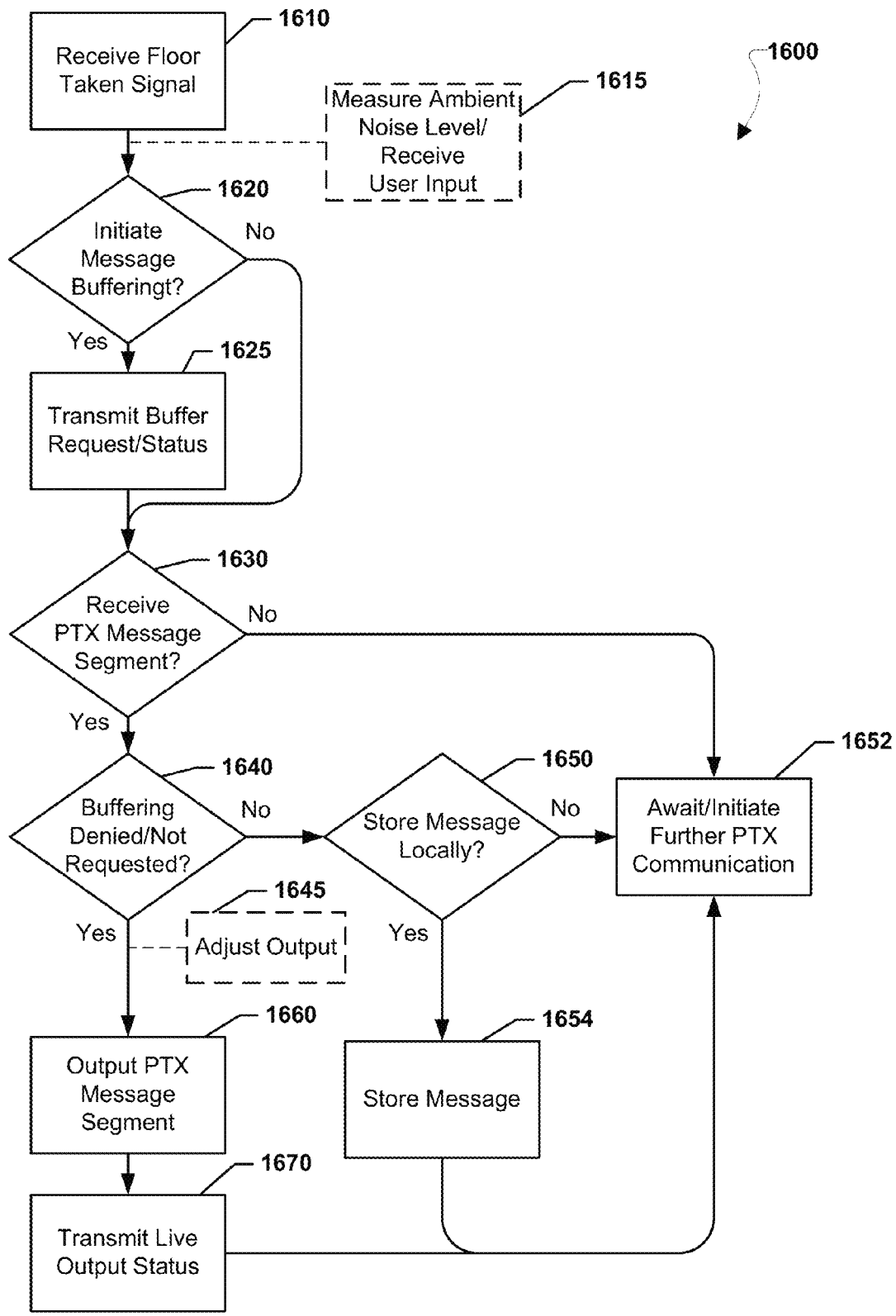
FIG. 16 is a process flow diagram of a further embodiment method of managing PTX communications.

FIG. 16 is a process flow diagram illustrating an embodiment method 1600 of managing PTX communications between PTX devices from the perspective of a recipient PTX device. In block 1610 a recipient PTX device may receive a floor taken signal. A floor taken signal may indicate an originating PTX device has been granted permission to control, at least temporarily, the main communications in a PTX session. Such control may include being the only one allowed to speak during the control period. Alternatively, such control may include the transmission of video or other data.

In an alternative embodiment, the recipient PTX device may attempt to be "aware" of an ambient noise level of its surroundings, in order to compensate for that level of noise. The recipient PTX device may be configured to detect an ambient noise level around the device in response to receiving a floor taken signal or even an actual PTX message segment. Additionally, a determination may be made as to whether the ambient noise level is below a quiet threshold. If the ambient noise level is below the quiet threshold a first adjusted output volume may be set. The first adjusted output volume may include a lower volume level than that of a preselected volume level of the device. Alternatively, the first adjusted output volume may include an output of the PTX message segment through an earpiece paired to the device. As yet a further alternative, a screen text indication and/or the use of preselected "quiet-mode" settings for the device may be set. In contrast, when the device detects a "loud" environment (i.e., a relatively high level of ambient noise), like being at a concert or being in a noisy crowd, the device may be configured to further determine whether the ambient noise level is above a loud threshold. If the ambient noise level is above that loud threshold a second adjusted output volume may be set. The second adjusted output volume may include a higher volume level than that of a preselected volume level of the device. Additionally or alternatively, the second adjusted output volume may include an output of the PTX message through an earpiece paired to the device, a screen text indication, the use of preselected "loud-mode" setting for the device and/or a buffer request may be transmitted. Other device behaviors can be used to augment or enhance the experience, such as playing tones at an appropriate volume or using vibrate when tones would be not advantageous. Thus, in block 1615 the ambient noise level may be measured, or the user may either react to the incoming message by inputting a buffer request or predefined settings on the device may automatically generate such a request. As yet a further alternative, the process may skip from block 1615 to block 1645 without making a buffer request, in which case only the PTX message segment output will be adjusted.

A determination may be made in block 1620 as to whether message buffering should be initiated from the subject recipient PTX device. The initiation of such buffering may be done after receiving a floor taken signal, after receiving a PTX message segment or after the alternative in block 1615 relating to an ambient noise measurement or received user input. If it is determine buffering should be initiated (i.e., determination block 1620=Yes) in block 1625 a buffer request and/or status may be transmitted to the server. Where a buffer status is transmitted, a received PTX message segment may be stored in a local memory. In this way the buffer status reflects the condition of or confirms the storage of the PTX message segment. After the buffer request or status is transmitted or if no buffer request was initiated (i.e., determination block 1620=No) a determination may be made as to whether a PTX message segment is received by the recipient PTX device. If no PTX message segment is received (i.e., determination block 1630=No) this may be taken as an acceptance of the buffer request. Thus, in block 1652 the recipient PTX device may await further PTX communications or initiate its own, such as by transmitting a ready signal as discussed below.

If a PTX message segment is received by the recipient PTX device (i.e., determination block 1630=Yes) this may mean no buffer request was made, no buffer request is currently active from the subject recipient PTX device (i.e., a prior buffer request was withdrawn in order to make it not currently active) or potentially that a buffer request was denied/revoked. For example, after a buffer request or status in initially indicated, receipt of the PTX message segment anyway may mean the buffer request was denied or revoked. Thus, if the buffer request was denied, no buffer request was made or is active (i.e., determination block 1640=Yes) at block 1660 the received PTX message segment may be output at the recipient PTX device. Alternatively, as noted above with regard to the ambient noise detection, in block 1645 the output of the recipient PTX device, such as the volume or method of output, may be adjusted. However, if the PTX message segment is output at block 1660 without any buffering or substantial delay from when it was transmitted, the output at the recipient PTX device is considered "live." Thus, a live output status may be transmitted in block 1670 from the recipient device, indicating that recipient device is a live participant in the PTX session.

In an embodiment, if a PTX message segment is received by the recipient PTX device (i.e., determination block 1630=Yes) this may alternatively mean the PTX message segment is meant to be stored locally at the recipient PTX device. Thus, if a buffer request was made, is active and the buffer request was not denied (i.e., determination block 1640=No) this may mean the PTX message segment is meant to be stored locally. If the recipient PTX device is not able to store the message segment locally (i.e., determination block 1650=No), in block 1652 it may await further PTX communication or initiate its own. For example, the recipient PTX device may in block 1652 transmit a signal indicating it is unable to locally store the PTX message segment. If the recipient PTX device is able to store the message segment locally (i.e., determination block 1650=Yes), in block 1654 the PTX message segment may be stored in a memory of the recipient PTX device, after which it may proceed to block 1652 to await further PTX communications or initiate its own.

Figure 17:
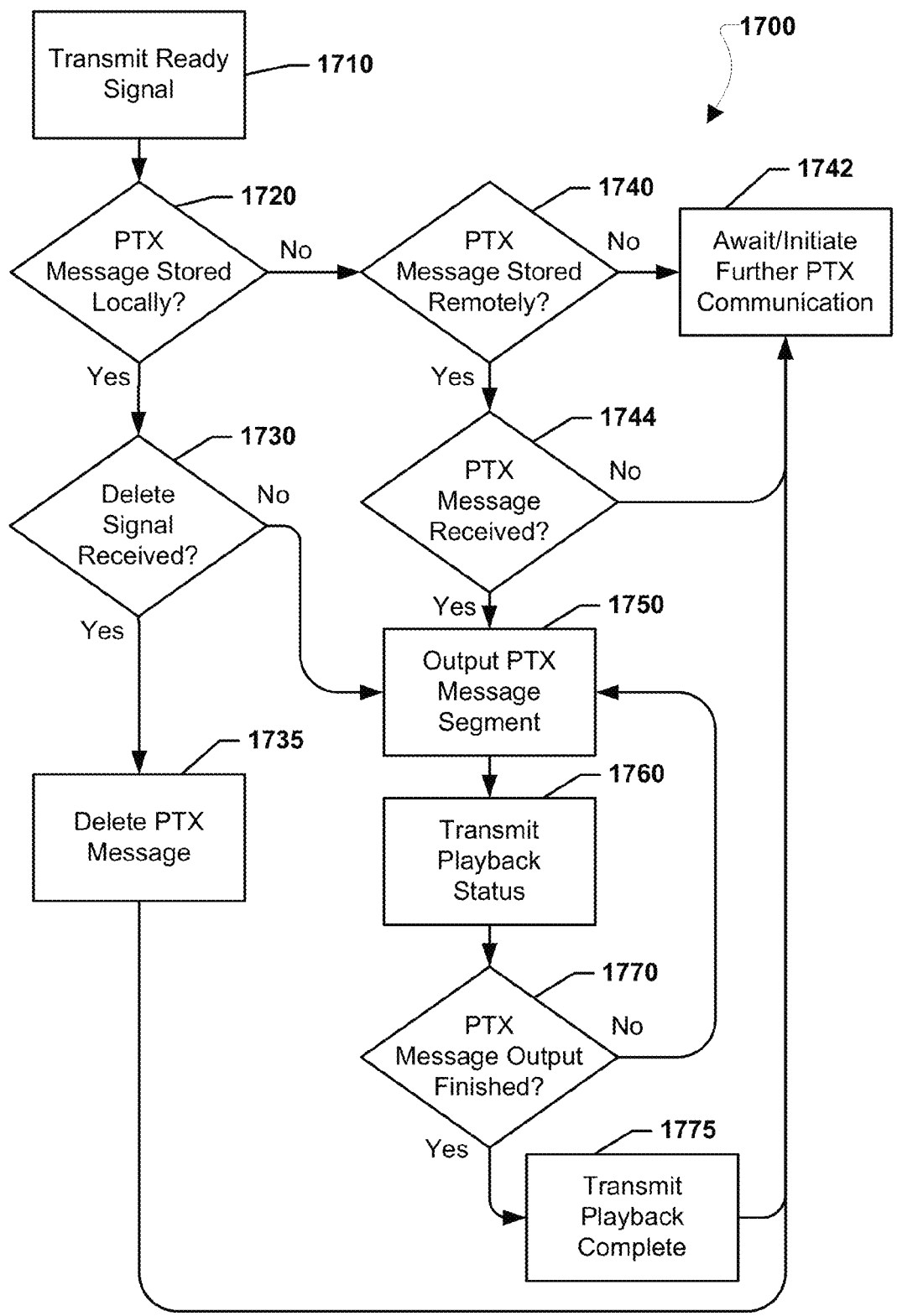
FIG. 17 is a process flow diagram of yet a further embodiment method of managing PTX communications.

FIG. 17 is a process flow diagram illustrating an embodiment method 1700 of managing PTX communications between PTX devices from the perspective of a recipient PTX device, once it becomes ready to receive message segments. For example, the ambient noise level around the recipient PTX device may have changed and once that level is appropriate the recipient device may be ready to playback or otherwise receive PTX message segments. A determination may thus be made as to whether the ambient noise level is above or below a "loud" or "quite" threshold. Alternatively, the user of the recipient device may manually input an indication of readiness to receive messages. Thus, in block 1710 a recipient PTX device may transmit a ready signal to the server indicating the recipient PTX device is ready to output PTX message segments. Thereafter, the originating PTX device message segment(s) may be played back on the recipient PTX device. The play back may be initiated prior to the originating PTX device stopping the transmission of live messaging.

If one or more PTX message segments were stored locally on the recipient PTX device (i.e., determination block 1720=Yes), before playing it back a determination may be made as to whether a delete signal was received from the originating PTX device. Receipt of a delete signal is an indication the originating PTX device does not want the stored message segment(s) played back. If a delete signal was received (i.e., determination block 1730=Yes) then the locally stored PTX message segment(s) may be deleted in block 1735. If the PTX message segment(s) were not stored locally (i.e., determination block 1720=No) a determination may be made as to whether they were stored remotely. For example, the could be stored at the originating PTX device, the server or some other resource. If they were not stored remotely (i.e., determination block 1740=No) in block 1742 the recipient PTX device may await further PTX communications or initiate its own. If they were stored remotely (i.e., determination block 1740=Yes) a determination is made as to whether the stored PTX message segment is received. If no message is received from the remote storage (i.e., determination block 1744=No), the process may proceed to block 1742 to await further PTX communications or initiate its own. If one or more message segments are received (i.e., determination block 1744=Yes) in block 1750 the PTX message segment may be output at the recipient PTX device. Similarly, if the PTX message segment had been stored locally and not delete signal received (i.e., determination block 1730=No), in block 1750 the PTX message segment may be output at the recipient PTX device.

In an embodiment, as described above, the playback status of buffered message segments may be reported to the server, the originating PTX device and optionally the rest of the PTX group. Thus, in response to outputting a PTX message segment in block 1750 a playback status may be transmitted at least to the server from the outputting recipient PTX device. If the PTX message segment output is not finished (i.e., determination block 1770=No) the recipient PTX device in block 1750 may continue to output the PTX message segment and in block 1760 report the playback status. Once the PTX message segment is finished outputting (i.e., determination block 1770=Yes) a playback complete signal may be transmitted in block 1775. Thereafter, the process may proceed to block 1742 to await further PTX communications or initiate its own.

Various embodiments are directed to PTX communication enhancements as compared to conventional PTX services, systems and hardware. It should be understood that the present embodiments may be implemented in software, such that the user need not "push" a physical button to talk. In various embodiments, the user interface can allow the user to interact with the PTX network by activating icons or in a hands-free mode, which allows the user to more easily multitask and to utilize the device speakerphone and/or earpiece mode in a more natural way.

Various embodiments may implement a more visual experience than is previously employed, and may utilize visual feedback cues to the user which may augment or replace the existing audio cues for floor control and mediation. The visual feedback cues may be provided via graphical elements and colors on the display screen of the wireless device. In various embodiments, the feedback cues may show the state of a group communication session and individual message segments, and may indicate, for example, control of the floor for group communication. In various embodiments, the display screen may display visual features which tell the user when the floor is open, when the floor is requested by user's device, when the floor controlled by user's device or by a different device, when buffer requests have been made, when buffering is taking place and the playback status of buffered message segments. In some embodiments, the display screen may also display visual representations of the members of the group in the group communication, and may further display the participation state(s) of each member of the group. For example, the device may display the members of the group who are currently participating in the group communication session as well as the members of the group delayed and potentially playing back message segments on a delay. These enhanced features may be implemented in software which runs on the user's wireless device, and may also be implemented in part in a server.

Figure 18:
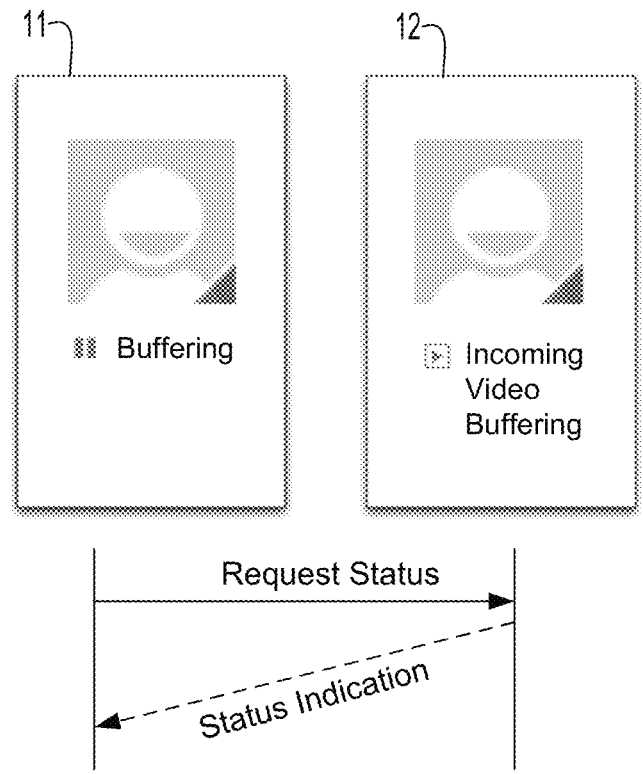
FIG. 18 illustrates a video call flow diagram in accordance with an embodiment.

FIG. 18 illustrates a call flow during of a PTX communication including video. An originating device 11 is shown requesting a status, which reflects the state of a recipient device 12. The recipient device 12 may in turn transmit a status indication. The status indication may indicate the recipient device is ready, needs buffering or is simply unavailable. The status indication transmitted from the recipient device 12 to the originating device 11 may be displayed on the originating device 11 (i.e., on a UI display). As shown in FIG. 18, a status indication of "Buffering" is indicated, which reflects that video message transmitted from the originating device 11 is being saved to a memory buffer. Similarly, the recipient device 12 may display a status showing "incoming video buffering" to let the recipient user know a video message is being saved. The originating device may elect to stop pointing the originating device camera at the otherwise desired image or turn off the video broadcast entirely if no one is watching.

Figure 19:
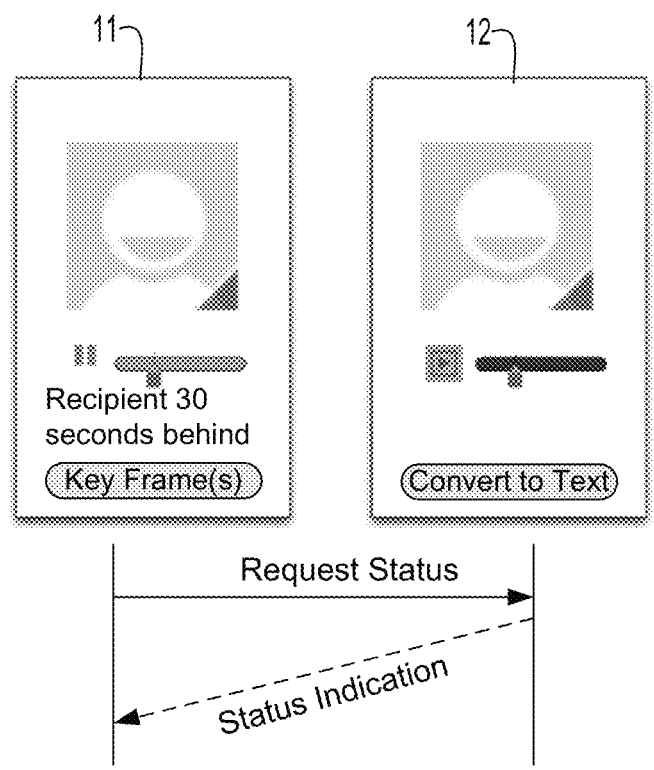
FIG. 19 illustrates another video call flow diagram in accordance with an embodiment.

FIG. 19 illustrates a recipient device 12 in the process of playing back the video in the memory buffer. The recipient device may elect to play back the transmitted communications when ready, may have the audio message converted to a text message or may fast-forward through the audio/video message to get caught up with the live broadcast from the originating device. Once again, the originating device is provided a status indication reflecting that the recipient is outputting the buffered message segment and is currently 30 seconds behind the live broadcast which continues to buffer. The originating device 11 may also be able to play back the video communication it generated in order to delete segments or select key frames from the video for the recipient device to view. FIG. 19 further illustrates that an originating user may use the "Key Frame(s)" button to designate key frames from a video transmission, which the recipient user may elect to view rather than a full video.

Figures 20A, 20B, 20C:
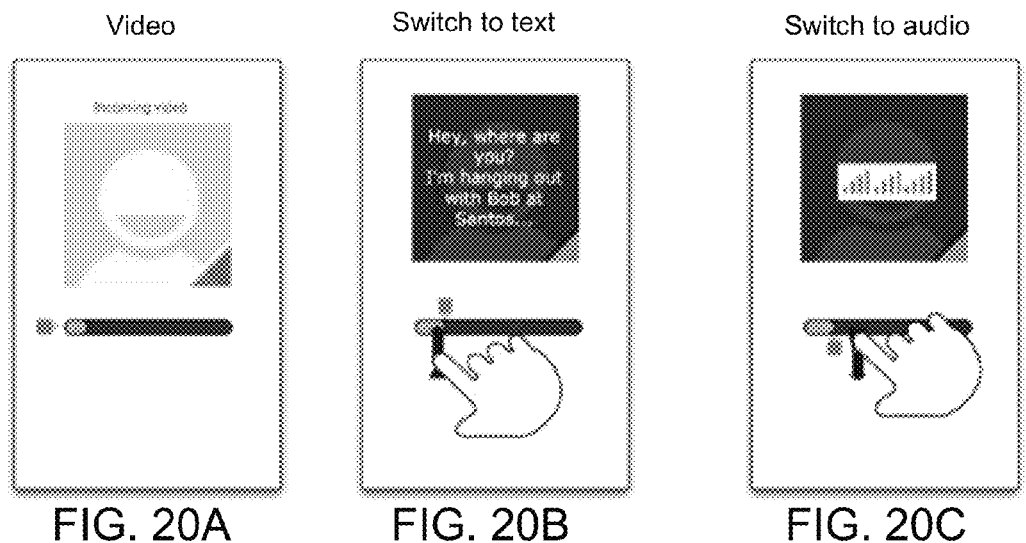
FIGS. 20A-20E illustrate manual mode switching during PTX communications in accordance with an embodiment.
Figures 20D, 20E:
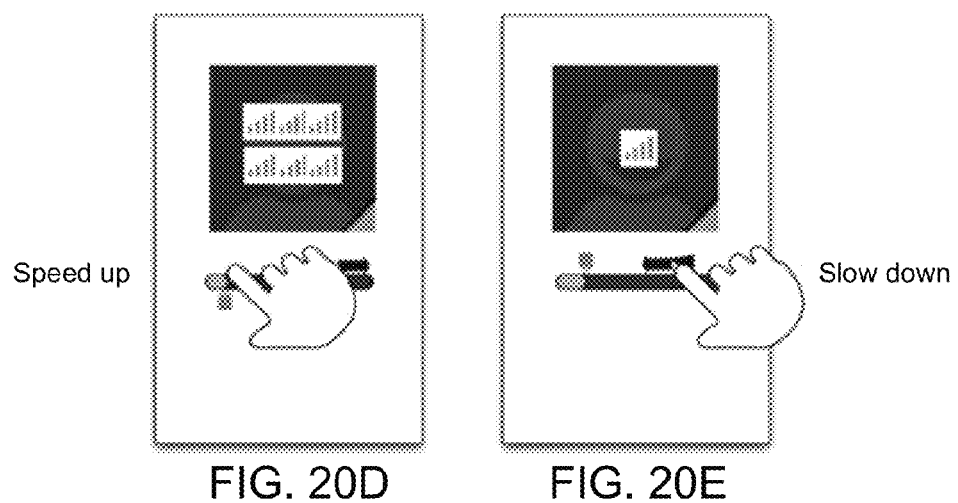

FIGS. 20A-20E illustrate embodiments where the output from PTX devices may be controlled using manual features. FIG. 20A illustrates a recipient device UI receiving an incoming video. FIG. 20B illustrates how a user may apply a vertical swipe to the UI in order to convert the audio component of the communication to text. This aspect uses a speech to text recognition algorithm to display the converted speech on the UI. Similarly, a motion-triggered activation may be used as a switch. For example if the PTX device is shaken or is moving too much, a sensor may detect this and switch modes of operation. While this aspect includes an automated feature, the input may be received by user activity (i.e., user input) such as shaking the device. FIG. 20C illustrates how a user of a recipient device may apply a vertical swipe in the opposite direction in order to switch back to an audio mode. FIGS. 20D and 20E illustrate how a user might elect to speed up or slow down the audio or video transmission by making another selection on the UI. FIG. 20D shows how a lateral swipe may speed up the audio and/or video transmission. FIG. 20E shows how another lateral swipe in the opposite direction may slow down the audio and/or video transmission. Alternatively, inputs may be provided from the user or a sensor that enables an audio only mode or a video only mode. These inputs may be done either by direct contact with the PTX device by the user or with gesture recognition. Gesture recognition may be performed by a PTX device provided with a camera and software capable of detecting and analyzing physical movements of the user or the orientation of the device. For example, a vertical hand swipe by the user may represent one action and a horizontal hand swipe represents another. Alternatively, an orientation of the recipient device may be employed, such as facing the device right-side down or right-side up. Additional gesture controls may be provided in order to allow the user to alter where the audio or video complement is displayed and or heard. For example, a mobile phone with a paired wrist worn device with a screen could be used as an alternate output for message segments or parts thereof.

As a further alternative the recipient device may use sensors to determine the user's condition and selects an appropriate mode. Also, that mode may be switched as the users environment changes such as when a bright sun goes behind the clouds in an outdoor environment or if the ambient noise levels around the recipient device changes. FIGS. 21A-21E illustrate embodiments where the output from PTX devices may be controlled using automated features. FIG. 21A illustrates a recipient device UI receiving an incoming video. Similar to that of FIG. 20A. FIG. 21B illustrates how a sensor, such as a microphone, may detect that the ambient noise around recipient device is too loud and thus switch to a text output mode, which converts the audio component of the communication to text. This aspect may also use a speech to text recognition algorithm to display the converted speech on the UI. FIG. 21C illustrates how a further sensor, such as a light sensor, may be used to detect the ambient brightness. In this way the device may detect that the environment is too bright for the display to be seen and so it may switch to audio mode. Such a switch may also conserve energy for the device. FIGS. 21D and 21E illustrate how an auto detect mode might be used to speed up or slow down the audio or video transmission. FIG. 21D shows an example of how a microphone may detect a pause in the user's speech so that the recipient device automatically speeds up the audio and/or video transmission. Alternatively, if the recipient device falls too far behind the live broadcast, such as beyond a predetermined duration, the device may automatically speed up or the recipient device to catch up to the live broadcast. FIG. 21E shows how the device may slow down the audio and/or video transmission upon detecting a lag in the communication stream.

Figure 22:
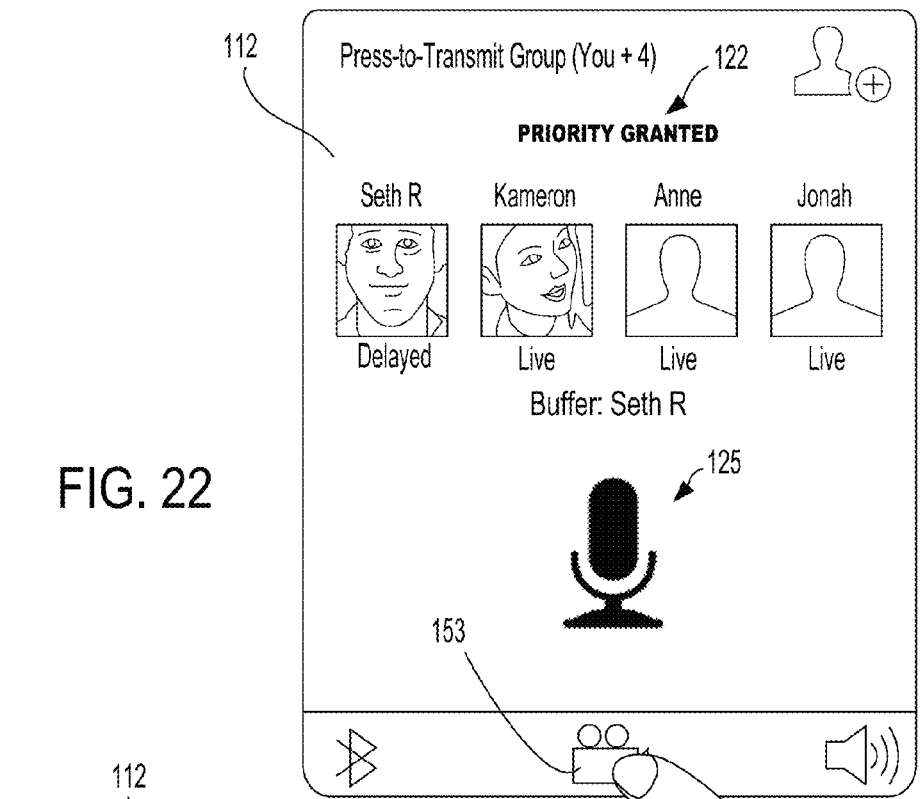
FIG. 22 is another screenshot of a touch-screen display of an originating PTX device illustrating the activation of the video on mode from the video off mode.
Figure 23:
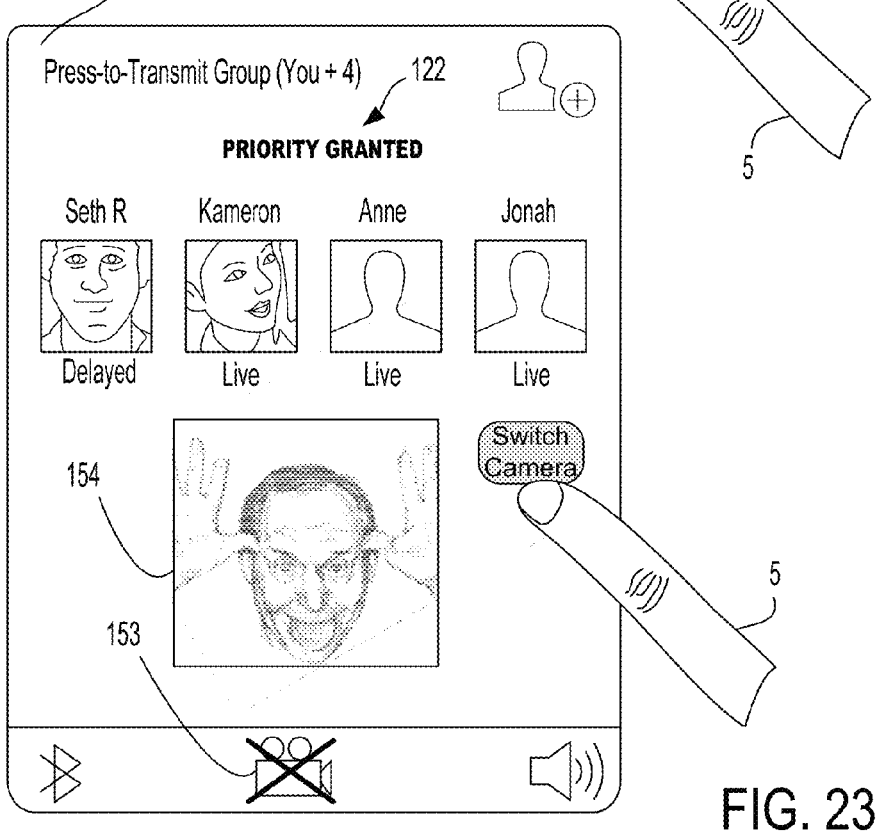
FIG. 23 is screenshot similar to that shown in FIG. AO illustrating the video on mode.

FIG. 22 illustrates how a user 5 of an originating device may supplement an active PTX group communication session from an audio only session, to add video to the session. By pressing the "add video" icon 153, which acts like a button, the user can toggle a video transmission option on or off FIG. 22 shows the video transmission in an off mode. FIG. 23 illustrates how the UI changes once the user 5 presses the "add video" icon 153. In particular, a video display window 154 appears showing a video image taken by a camera on the originating device. In FIG. 23 the "add video" icon 153 is shown with an X to indicate pressing the icon again will switch the device to a video transmission off mode. In this example the device camera is presumably facing the user, however a "Switch Camera" button may also be provided, if a camera is available facing away from the user. Alternatively, the camera switch may be achieved through a voice-activated command from a user. Additionally, they further alternate aspect may allow other group members to activate the camera switch from their end. For example during a session where an originating device is using a back camera (also referred to as a "see what I see" session) and a group member wants to see the originating device users face, that group member may be allowed to switch the camera is on the originating device. Such remote camera switch functions may also be activated through a UI for voice command feature, if available. Switching to a camera facing away from the user may be helpful in this scenario, such as a construction site where a user wants to show to others a situation or a problem or progress that has been made. With either the user facing or opposite camera active, any faces that are clear in the display may be used in conjunction with image recognition and facial expression recognition algorithms. In this way, objects or things that are recognizable by an image recognition algorithm may be communicated to the PTX group. Also, facial expression recognition algorithms may be used to translate facial expressions into text or emoticons that may similarly be communicated to the PTX group. Further, more advanced image recognition algorithms may be used to convert sign language being expressed by a user into a text message or an audio message. Such conversions and/or translations may be done from at least one still image or video images.

Figure 24:
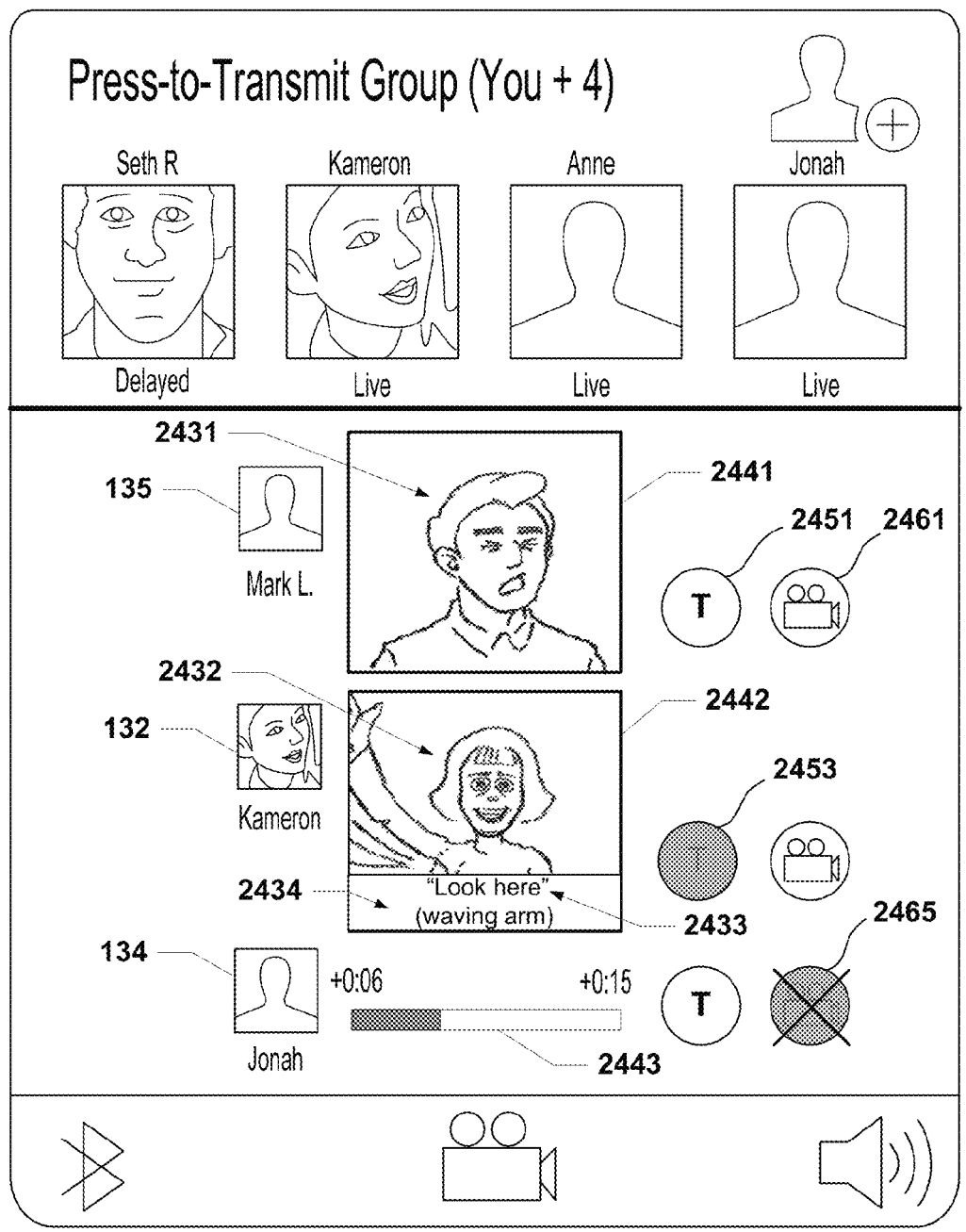
FIG. 24 illustrates a screenshot of a touch screen display of an originating PTX device illustrating multiple video streams being transmitted and received simultaneously.

FIG. 24 illustrates a screenshot of a PTX device with a touch-screen display in accordance with a further embodiment in which an originating or recipient device is capable of receiving several input streams (including audio, video and/or data) simultaneously. Thus, the UI shown in FIG. 24 includes multiple input stream display portions 2441, 2442, 2443 below the group member display representing each received input stream. In this embodiment, the PTX device is receiving input streams from three PTX group members 132, 134, 135. In this illustrative example the first display portion 2441 includes a video segment 2431 included as part of the input stream received from PTX group member Mark L. 135. The device shown may be outputting an audio segment that corresponds to the video segment, which in this circumstance corresponds to the actual speech coming from that member 135. The UI may be provided with option buttons, such as a speech-to-text conversion feature 2451 (such as a button labeled "T") or a video off feature 2461 (such as the button with a video icon). The first display portion 2441 shows the speech-to-text conversion feature 2451 in an off mode and the video switch 2461 in an on mode. The second display portion 2442 also includes a video segment 2432 from PTX group member Kameron 132. However, an audio segment of Kameron's speech has been switched to speech-to-text translation mode. Thus, the words spoken by Kameron are displayed in a caption region 2433 below the corresponding video segment 2432. Also, the speech-to-text conversion feature 2453 is indicated as being in an on mode. This example includes a further option that includes action-to-text translation where motion recognition is employed to recognize that Kameron is waving her hand. The action-to-text conversion generates an interpretation of the image or images analyzed. The interpreted action may be output as text (referred to as a "text interpretation") or spoken words (referred to as an "audio interpretation") after further being processed through a text-to-speech algorithm. Generally, the action-to-text conversion recognizes the movements of a body part and facial gestures when they match pre-programmed and recognizable movements. An output of the converted action-to-text is an interpretation of the action, whether output through text or a verbal description of the text in the form of an audio output. Thus, the caption region 2433 is augmented with a gesture indication 2434 that indicates "waving arm."

The third display portion 2443 in FIG. 24 does not include a video segment, which is reflected by the video on/off switch 2465 shown as unavailable. Nonetheless, an audio segment from user Jonah 134 is being output from the PTX device simultaneously with the audio complement from user Mark L. 135. In this way, rather than hearing and seeing all the video and audio segments simultaneously, a user of a PTX device may elect to watch only select ones of the available videos or only listen to select ones of available audio. In this way the recipient device may selectively display a video stream from one originating device that includes an audio output and display only the video stream from another originating device without the audio output there from.

Figure 25:
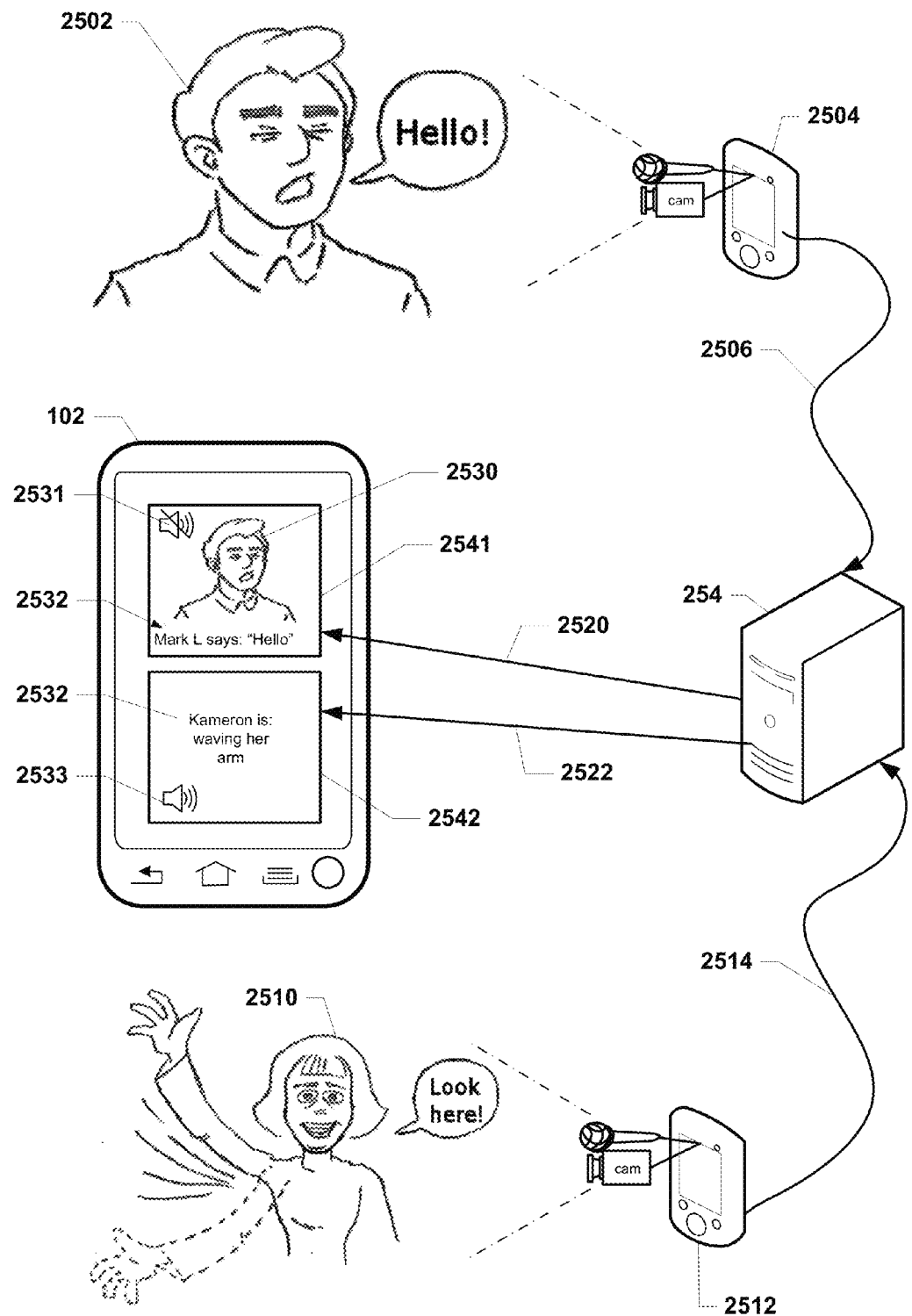
FIG. 25 illustrates a PTX group communicating multiple simultaneous communication streams in accordance with an embodiment.

FIG. 25 illustrates multiple simultaneous communication streams being received by a single user device 102. A first originating device 2504 includes a camera and microphone which may capture the speech and video image of the first user 2502. Both the speech and video image may be transmitted via communication lines 2506 to a server 254. Similarly, the second originating device 2512, which also include a camera and microphone, may capture and transmit speech video image of the second user 2510. The audio/video communications from the second originating device 2512 may be transmitted via additional communication lines 2514 to the server 254. In this way, the various message segments from the first originating device 2504 and the second originating device 2512 may be communicated via streams 2520, 2522 to a single user device 102. A first display portion 2541 of the user device may thus output the communication stream 2520 from the first originating device 2504 and a second display portion 2542 may output the communication stream 2522 from the second originating device 2512. In this illustrative example the audio component of the first communication stream 2520 has been turned off as indicated by the mute symbol 2531 in the upper left corner. However, the video component 2530 may remain actively displaying the first display portion 2541. With the audio output turned off, and a speech-to-text recognition feature activated, a caption 2532 may also be displayed. Also, while the audio component of the second communication stream 2522 is active as indicated by the speaker symbol 2533, the video complement of that communication is shown as having been turned off. This embodiment shows an example of image recognition as an algorithm has recognized that the second user 2510 is waving her arms. This recognition is reflected by the indication in the second display portion 2542 showing "Kameron is: waving her arm." Gestures conveyed by the movement of body parts may generally be recognized in this way. A further enhancement to this feature may even include language conversions of the subtitle text or video dubbing in the form of an audio portion translated to a desired language. Further still, action to text conversion features may be provided such that physical movements of an originating user in a video portion of a message segment are translated to text or an audio output.

Figure 26:
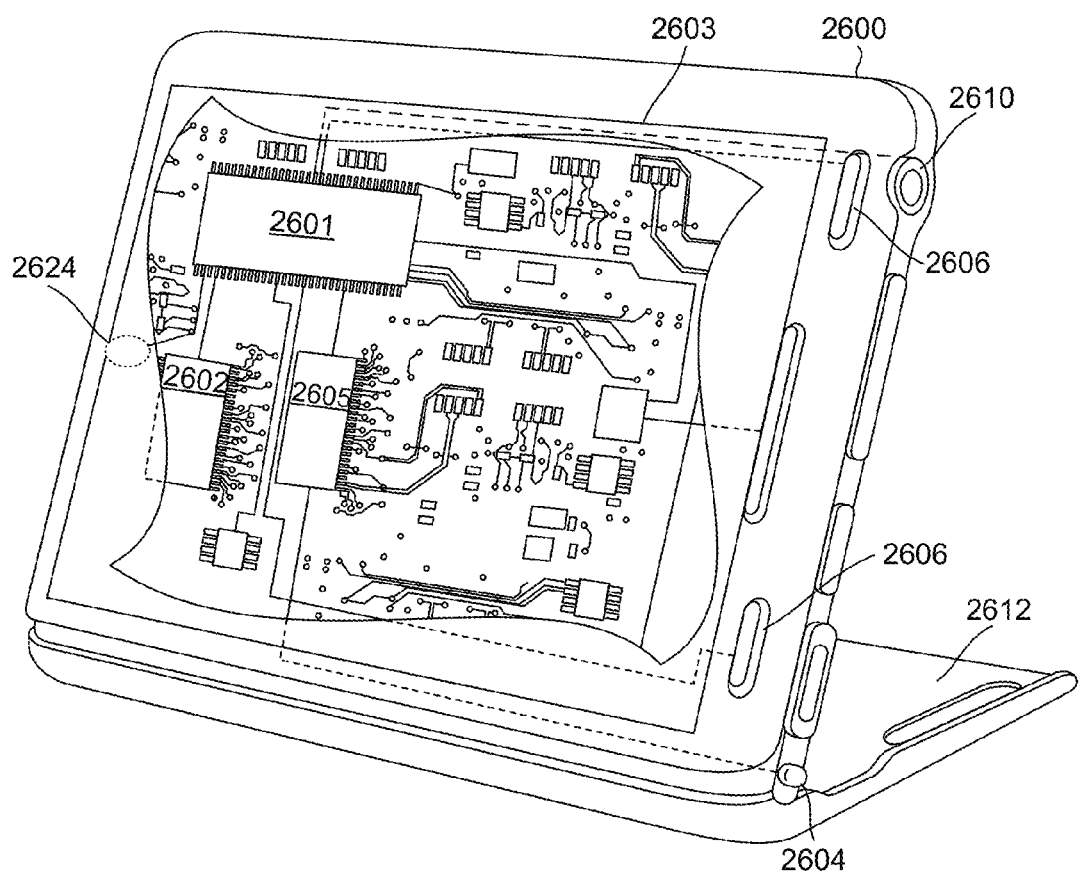
FIG. 26 is a component block diagram of a mobile device suitable for use in the various embodiments.

The embodiments may be implemented in a variety of mobile wireless communication devices, particularly mobile computing devices. An example of a wireless communication device that may implement the various embodiments is a Smartphone 2600 illustrated in FIG. 26. A wireless communication device, such as a Smartphone 2600, may include a processor 2601 coupled to memory 2602 and to a radio frequency data modem 2605. The modem 2605 may be coupled to an antenna 2604 for receiving and transmitting radio frequency signals. The Smartphone 2600 may also include a display 2603, such as a touch screen display. The mobile device 2600 may also include user input devices, such as buttons 2606 to receive user inputs or microphones 2610 to measure ambient noise levels or receive sounds. In the various embodiments the Smartphone 2600 includes a tactile output surface, which may be positioned on the display 2603 (e.g., using E-Sense™ technology), on a back surface 2612, or another surface of the mobile device 2600. The mobile device processor 2601 may be any programmable microprocessor, microcomputer or multiple processor chip or chips that can be configured by instructions (i.e., applications or more generally software) to perform a variety of functions, including the functions of the various embodiments described herein. Typically, software applications may be stored in the internal memory 2602 before they are accessed and loaded into the processor 2601. In some mobile computing devices, additional memory chips (e.g., a Secure Data (SD) card) may be plugged into the mobile device and coupled to the processor 2601. The internal memory 2602 may be a volatile or nonvolatile memory, such as flash memory, or a mixture of both. For the purposes of this description, a general reference to memory refers to all memory accessible by the processor 2601, including internal memory 2602, removable memory plugged into the mobile device, and memory within the processor 2601.

Figure 27:
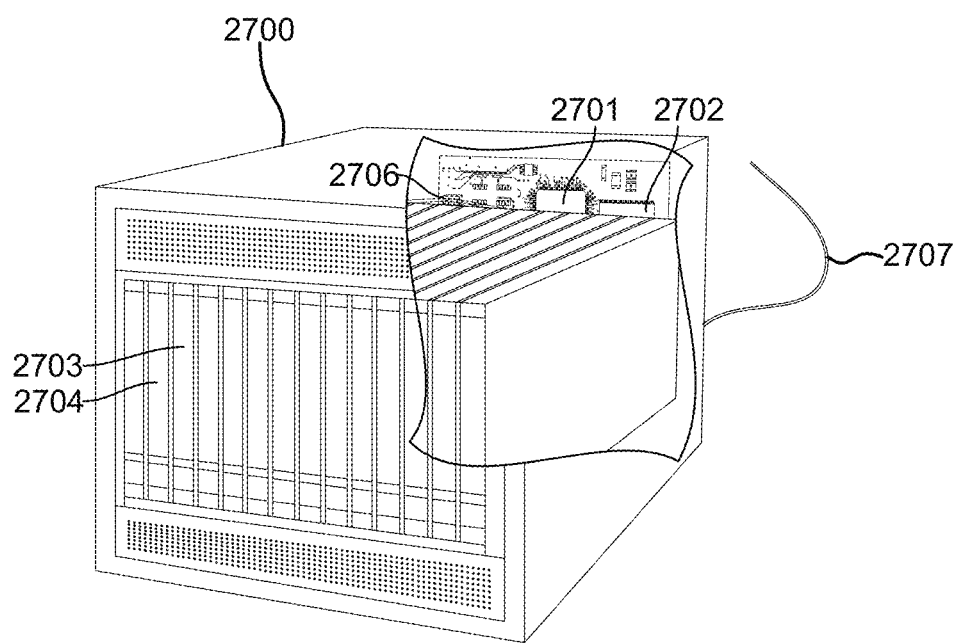
FIG. 27 is a component block diagram of a server device suitable for use in the various embodiments.

The various embodiments may be implemented on any of a variety of commercially available server devices, such as the server 2700 illustrated in FIG. 27. Such a server 2700 typically includes a processor 2701 coupled to volatile memory 2702 and a large capacity nonvolatile memory, such as a disk drive 2703. The server 2700 may also include a floppy disc drive, compact disc (CD) or DVD disc drive 2706 coupled to the processor 2701. The server 2700 may also include network access ports 2704 coupled to the processor 2701 for establishing data connections with a network 2705, such as a local area network coupled to other broadcast system computers and servers. The processors 2601, 2701 may be any programmable microprocessor, microcomputer or multiple processor chip or chips that can be configured by instructions (applications or software) to perform a variety of functions, including the functions of the various embodiments described above. In some devices, multiple processors 2601, 2701 may be provided, such as one processor dedicated to wireless communication functions and one processor dedicated to running other applications. Typically, software applications may be stored in the internal memory 2602, 2702, and 2703 before they are accessed and loaded into the processor 2601, 2701.

The processor 2601, 2701 may include internal memory sufficient to store the application instructions. In many devices the internal memory may be a volatile or nonvolatile memory, such as flash memory, or a mixture of both. For the purposes of this description, a general reference to memory refers to memory accessible by the processor 2601, 2701 including internal memory or removable memory plugged into the device and memory within the processor 2601, 2701 itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on as one or more instructions or code on a non-transitory computer-readable storage medium. The steps of a method or algorithm disclosed herein may be embodied in a processor-executable software module which may reside or be stored on a non-transitory computer readable storage medium or processor-readable medium. Non-transitory computer-readable and processor-readable storage media may be any available media that may be accessed by a computer or processor. By way of example, and not limitation, such non-transitory computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method of managing electronic communications on a communication device, comprising:
    receiving at the communication device an incoming call indication from a originating device;
    transmitting a delay indication to the originating device;
    receiving a first message segment from the originating device; and
    transmitting a playback status to the originating device including a series of status indications reflecting an updated output progress of the first message segment at the communication device in response to the first message segment should be being output.

2. The method of claim 1, further comprising:
    receiving from the originating device a playback interrupt halting the playback of the first message segment.

3. The method of claim 1, further comprising:
    halting a playback of the first message segment in response to receiving a second message segment prior to completion of an output of the first message segment; and
    outputting the second message segment.

4. The method of claim 1, wherein outputting the first message segment includes a speech-to-text conversion of spoken words contained within the first message segment and a second message segment.

5. The method of claim 1, wherein outputting the first message segment includes speeding-up portions of the first message segment.

6. The method of claim 1, further comprising:
    detecting an ambient environment surrounding the communication device, wherein transmitting the delay indication is in response to the ambient environment meeting a threshold.

7. The method of claim 1, further comprising:
    contemporaneously outputting a plurality of message segments each from another device, wherein at least one of the plurality of message segments includes an audio portion translated to text.

8. A communication device, comprising:
    a memory; and
    a processor coupled to the memory and configured with processor-executable instructions to perform operations comprising:
        receiving an incoming call indication from an originating device;
        determine whether a delayed call acceptance is warranted;
        transmitting a delay indication to the originating device;
        receiving a first message segment from the originating device;
        transmitting a playback status to the originating device including a series of status indications reflecting an updated output progress of the first message segment at the communication device in response to the first message segment being output.

9. The communication device of claim 8, wherein the processor is configured with processor-executable instructions to perform operations further comprising:
    receiving from the originating device a playback interrupt halting the playback of the first message segment.

10. The communication device of claim 8, wherein the processor is configured with processor-executable instructions to perform operations further comprising:
    halting a playback of the first message segment in response to receiving a second message segment prior to completion of an output of the first message segment; and outputting the second message segment.

11. The communication device of claim 8, wherein the processor is configured with processor-executable instructions to perform operations such that outputting the first message segment comprises outputting a speech-to-text conversion of spoken words contained within the first message segment.

12. The communication device of claim 8, wherein the processor is configured with processor-executable instructions to perform operations such that outputting the first message segment comprises speeding-up portions of the first message segment.

13. The communication device of claim 8, wherein the processor is configured with processor-executable instructions to perform operations further comprising:
    detecting an ambient environment surrounding the communication device, wherein transmitting the delay indication is in response to the ambient environment meeting a threshold.

14. The communication device of claim 8, wherein the processor is configured with processor-executable instructions to perform operations such that the communication device contemporaneously outputs a plurality of message segments each from another device, wherein at least one of the plurality of message segments includes an audio portion translated to text.

15. A method of managing electronic communications on a communication device, comprising:
    receiving a delay indication associated with a delayed recipient device in response to the communication device transmitting a call initiation signal;
    transmitting a first message segment for storage in a memory; and
    receiving a first playback status indicating first output progress of the first message segment retrieved from the memory and at least partially output from the delayed recipient device.

16. The method of claim 15, further comprising:
    transmitting a playback interrupt halting the playback of the first message segment at the delayed recipient device.

17. The method of claim 15, further comprising:
    transmitting a second message segment interrupting a playback of the first message segment at the delayed recipient device.

18. The method of claim 15, further comprising:
    receiving, contemporaneously with receipt of the delay indication, a non-delay indication associated with a non-delayed recipient device.

19. The method of claim 15, further comprising:
receiving, contemporaneously with receipt of the first playback status, a second playback status indicating a second output progress of the first message segment output from another recipient device.

20. The method of claim 15, further comprising:
outputting a speech-to-text conversion of the first message segment in response to receipt of the delay indication.

\* \* \* \* \*